United States Patent
Cherian et al.

(10) Patent No.: US 9,369,951 B2
(45) Date of Patent: Jun. 14, 2016

(54) METHODS, ACCESS POINT AND WIRELESS DEVICE FOR REDUCING OVERHEAD WHEN TRANSMITTING SIGNALING MESSAGES RELATING TO LINK ESTABLISHMENT BETWEEN AN ACCESS POINT AND A WIRELESS DEVICE

(71) Applicant: QUALCOMM Incorporated, San Diego, CA (US)

(72) Inventors: George Cherian, San Diego, CA (US); Simone Merlin, Solana Beach, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 14/467,447

(22) Filed: Aug. 25, 2014

(65) Prior Publication Data

US 2015/0063333 A1 Mar. 5, 2015

Related U.S. Application Data

(60) Provisional application No. 61/872,166, filed on Aug. 30, 2013.

(51) Int. Cl.
| | |
|---|---|
| *H04W 4/00* | (2009.01) |
| *H04W 48/16* | (2009.01) |
| *H04W 76/02* | (2009.01) |
| *H04W 24/02* | (2009.01) |

(Continued)

(52) U.S. Cl.
CPC .............. *H04W 48/16* (2013.01); *H04W 24/02* (2013.01); *H04W 28/22* (2013.01); *H04W 48/14* (2013.01); *H04W 48/20* (2013.01); *H04W 52/18* (2013.01); *H04W 76/021* (2013.01); *H04W 76/025* (2013.01); *H04L 1/0002* (2013.01); *H04W 88/08* (2013.01)

(58) Field of Classification Search
CPC .. H04W 48/16; H04W 76/021; H04W 76/025
USPC .......................................................... 370/228
See application file for complete search history.

(56) References Cited

U.S. PATENT DOCUMENTS

| | | | |
|---|---|---|---|
| 6,775,548 B1 | 8/2004 | Rong et al. | |
| 2005/0063356 A1 | 3/2005 | Larsen et al. | |
| 2007/0019584 A1 | 1/2007 | Qi et al. | |
| 2007/0064655 A1 | 3/2007 | Ruuska | |
| 2009/0067397 A1* | 3/2009 | Seok ...................... | H04L 12/24 370/338 |
| 2011/0286340 A1 | 11/2011 | Janecek et al. | |
| 2012/0155439 A1 | 6/2012 | Marinier et al. | |

(Continued)

FOREIGN PATENT DOCUMENTS

EP 2106037 A2 9/2009

OTHER PUBLICATIONS

International Search Report and Written Opinion—PCT/US2014/052708—ISA/EPO—Dec. 10, 2014.

*Primary Examiner* — Sai-Ming Chan
(74) *Attorney, Agent, or Firm* — Knobbe Martens Olson & Bear LLP

(57) ABSTRACT

Systems, methods, and devices for wireless communication are provided. In an embodiment, a method of wireless communication includes receiving, at an access point, a probe request from a wireless device, transmitting a probe response including shared access point state information, receiving an association request including an indication that the wireless device has stored the shared access point state information, and transmitting an association response conditionally including the shared access point state information based on the indication in the association request.

28 Claims, 17 Drawing Sheets

| (51) | Int. Cl. | |
|---|---|---|
| | *H04W 52/18* | (2009.01) |
| | *H04W 28/22* | (2009.01) |
| | *H04W 48/14* | (2009.01) |
| | *H04W 48/20* | (2009.01) |
| | *H04W 88/08* | (2009.01) |
| | *H04L 1/00* | (2006.01) |

(56) References Cited

U.S. PATENT DOCUMENTS

| | | | |
|---|---|---|---|
| 2013/0107825 | A1* | 5/2013 | Cherian .............. H04W 76/021 370/329 |
| 2013/0111044 | A1 | 5/2013 | Cherian et al. |
| 2013/0170345 | A1 | 7/2013 | Merlin et al. |

\* cited by examiner

METHODS, ACCESS POINT AND WIRELESS DEVICE FOR REDUCING OVERHEAD WHEN TRANSMITTING SIGNALING MESSAGES RELATING TO LINK ESTABLISHMENT BETWEEN AN ACCESS POINT AND A WIRELESS DEVICE

CROSS REFERENCE TO RELATED APPLICATIONS

This application claims priority to U.S. provisional application No. 61/872,166 filed Aug. 30, 2013, and entitled "METHODS AND SYSTEMS FOR HIGH EFFICIENCY COMMUNICATION IN WIRELESS ENVIRONMENTS." The disclosure of this prior application is considered part of this application, and is hereby incorporated by reference in its entirety.

BACKGROUND

1. Field

The present application relates generally to wireless communications, and more specifically to systems, methods, and devices for high efficiency wireless communication in dense wireless environments.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

However, multiple wireless networks may exist in the same building, in nearby buildings, and/or in the same outdoor area. The prevalence of multiple wireless networks may cause interference, reduced throughput (e.g., because each wireless network is operating in the same area and/or spectrum), and/or prevent certain devices from communicating. Thus, improved systems, methods, and devices for communicating when wireless networks are densely populated are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect of this disclosure provides a method of determining a communication rate for a high-efficiency wireless communication. The method includes receiving, at an access point, a probe request including a transmission power indication. The method further includes determining a received transmission power. The method further includes estimating a path-loss based on the transmission power indication and received transmission power. The method further includes transmitting a first probe response at a first rate. The method further includes transmitting a second probe response at a second data rate when the access point does not receive an acknowledgement to the first probe response within a timeout period, the second data rate being lower than the first rate.

Another aspect of the present disclosure provides a method of determining a communication rate for a high-efficiency wireless communication. The method includes transmitting, at a wireless device, a probe request including a transmission power indication. The method further includes receiving, from an access point, a probe response at either a first or second rate, the second rate being lower than the first rate. The method further includes transmitting an acknowledgement to the probe response at either the first or second rate based on the rate of the probe response.

Another aspect of the present disclosure provides a method of determining a communication rate for a high-efficiency wireless communication. The method includes transmitting, at an access point, one or more frames each including a transmission power indication. The method further includes receiving a probe request at a first rate. The method further includes transmitting a probe response at a second rate, the second rate being a function of the first rate.

Another aspect of the present disclosure provides a method of determining a communication rate for a high-efficiency wireless communication. The method includes receiving, at a wireless device, one or more frames from an access point, each frame including a transmission power indication. The method further includes estimating a link quality based on the transmission power indication. The method further includes transmitting a probe request at a first rate compatible with the estimated link quality. The method further includes receiving a probe response at a second rate, the second rate being a function of the first rate.

Another aspect of the present disclosure provides a method of high-efficiency wireless communication. The method includes receiving, at an access point, a probe request. The method further includes generating a probe response in response to the probe request. The method further includes conditionally including neighbor report information in the probe response based on an indication or absence of an indication in the probe request. The method further includes transmitting the probe response to a wireless device.

Another aspect of the present disclosure provides a method of high-efficiency wireless communication. The method includes determining, at a wireless device, whether neighborhood report information is stored. The method further includes transmitting a probe request conditionally including a request for neighbor report information based on said determining. The method further includes receiving a probe response. The probe response includes the neighbor report information when the probe request includes the request for neighbor report information.

Another aspect of the present disclosure provides a method of high-efficiency wireless communication. The method includes receiving, at an access point, a probe request including shared wireless device state information. The method further includes storing the shared wireless device state information for at least a timeout period. The method further includes transmitting a probe response indicating the timeout period. The method further includes receiving an association request omitting the wireless device state information within the timeout period.

Another aspect of the present disclosure provides a method of high-efficiency wireless communication. The method includes transmitting, at a wireless device, a probe request including shared wireless device state information. The method further includes receiving a probe response indicating a timeout period. The method further includes transmitting an association request omitting the wireless device state information within the timeout period.

Another aspect of the present disclosure provides a method of high-efficiency wireless communication. The method includes receiving, at an access point, a probe request from a wireless device. The method further includes transmitting a probe response including shared access point state information. The method further includes receiving an association request including an indication that the wireless device has stored the shared access point state information. The method further includes transmitting an association response omitting the shared access point state information.

Another aspect of the present disclosure provides a method of high-efficiency wireless communication. The method includes transmitting, at a wireless device, a probe request to an access point. The method further includes receiving a probe response including shared access point state information. The method further includes storing the shared access point state information. The method further includes transmitting an association request including an indication that the wireless device has stored the shared access point state information. The method further includes receiving an association response omitting the shared access point state information.

Another aspect of the present disclosure provides an apparatus for determining a communication rate for a high-efficiency wireless communication. The apparatus includes means for receiving a probe request including a transmission power indication. The apparatus further includes means for determining a received transmission power. The apparatus further includes means for estimating a path-loss based on the transmission power indication and received transmission power. The apparatus further includes means for transmitting a first probe response at a first rate. The apparatus further includes means for transmitting a second probe response at a second rate when the access point does not receive an acknowledgement to the first probe response within a timeout period, the second rate being lower than the first rate.

Another aspect of the present disclosure provides an apparatus for determining a communication rate for a high-efficiency wireless communication. The apparatus includes means for transmitting a probe request including a transmission power indication. The apparatus further includes means for receiving, from an access point, a probe response at either a first or second rate, the second rate being lower than the first rate. The apparatus further includes means for transmitting an acknowledgement to the probe response at either the first or second rate based on the rate of the probe response.

Another aspect of the present disclosure provides an apparatus for determining a communication rate for a high-efficiency wireless communication. The apparatus includes means for transmitting one or more frames each including a transmission power indication. The apparatus includes means for receiving a probe request at a first rate. The apparatus further includes means for transmitting a probe response at a second rate, the second rate being a function of the first rate.

Another aspect of the present disclosure provides an apparatus for determining a communication rate for a high-efficiency wireless communication. The apparatus includes means for receiving one or more frames from an access point, each frame including a transmission power indication. The apparatus further includes means for estimating a link quality based on the transmission power indication. The apparatus further includes means for transmitting a probe request at a first rate compatible with the estimated link quality. The apparatus further includes means for receiving a probe response at a second rate, the second rate being a function of the first rate.

Another aspect of the present disclosure provides an apparatus for high-efficiency wireless communication. The apparatus further includes means for receiving a probe request. The apparatus further includes means for generating a probe response in response to the probe request. The apparatus further includes means for conditionally including neighbor report information in the probe response based on an indication or absence of an indication in the probe request. The apparatus further includes means for transmitting the probe response to a wireless device.

Another aspect of the present disclosure provides an apparatus for high-efficiency wireless communication. The apparatus includes means for determining whether neighborhood report information is stored. The apparatus further includes means for transmitting a probe request conditionally including a request for neighbor report information based on said determining. The apparatus further includes means for receiving a probe response. The probe response includes the neighbor report information when the probe request includes the request for neighbor report information.

Another aspect of the present disclosure provides an apparatus for high-efficiency wireless communication. The apparatus includes means for receiving a probe request including shared wireless device state information. The apparatus further includes means for storing the shared wireless device state information for at least a timeout period. The apparatus further includes means for transmitting a probe response indicating the timeout period. The apparatus further includes receiving an association request omitting the wireless device state information within the timeout period.

Another aspect of the present disclosure provides an apparatus for high-efficiency wireless communication. The apparatus includes means for transmitting a probe request including shared wireless device state information. The apparatus further includes means for receiving a probe response indicating a timeout period. The apparatus further includes means for transmitting an association request omitting the wireless device state information within the timeout period.

Another aspect of the present disclosure provides an apparatus for high-efficiency wireless communication. The apparatus includes means for receiving a probe request from a wireless device. The apparatus further includes means for transmitting a probe response including shared access point state information. The apparatus further includes means for receiving an association request including an indication that the wireless device has stored the shared access point state information. The apparatus further includes means for transmitting an association response omitting the shared access point state information.

Another aspect of the present disclosure provides an apparatus for high-efficiency wireless communication. The apparatus includes means for transmitting a probe request to an access point. The apparatus further includes means for receiving a probe response including shared access point state information. The apparatus further includes means for storing the shared access point state information. The apparatus further includes means for transmitting an association request including an indication that the wireless device has stored the shared access point state information. The apparatus further includes means for receiving an association response omitting the shared access point state information.

Another aspect of the present disclosure provides an apparatus configured to determine a communication rate for a high-efficiency wireless communication. The apparatus includes a receiver configured to receive a probe request including a transmission power indication. The apparatus further includes a processor configured to determine a received transmission power. The processor is further configured to estimate a path-loss based on the transmission power indication and received transmission power. The apparatus includes a transmitter configured to transmit a first probe response at a first rate. The transmitter is further configured to transmit a second probe response at a second rate when the access point does not receive an acknowledgement to the first probe response within a timeout period, the second rate being lower than the first rate.

Another aspect of the present disclosure provides an apparatus configured to determine a communication rate for a high-efficiency wireless communication. The apparatus includes a transmitter configured to transmit a probe request including a transmission power indication. The apparatus further includes a receiver configured to receive, from an access point, a probe response at either a first or second rate, the second rate being lower than the first rate. The transmitter is further configured to transmit an acknowledgement to the probe response at either the first or second rate based on the rate of the probe response.

Another aspect of the present disclosure provides an apparatus configured to determine a communication rate for a high-efficiency wireless communication. The apparatus includes a transmitter configured to transmit one or more frames each including a transmission power indication. The apparatus further includes a receiver configured to receive a probe request at a first rate. The transmitter is further configured to transmit a probe response at a second rate, the second rate being a function of the first rate.

Another aspect of the present disclosure provides an apparatus configured to determine a communication rate for a high-efficiency wireless communication. The apparatus includes a receiver configured to receive one or more frames from an access point, each frame including a transmission power indication. The apparatus further includes a processor configured to estimate a link quality based on the transmission power indication. The apparatus further includes a transmitter configured to transmit a probe request at a first rate compatible with the estimated link quality. The receiver is further configured to receive a probe response at a second rate, the second rate being a function of the first rate.

Another aspect of the present disclosure provides an apparatus configured to communicate in a high-efficiency wireless communication network. The apparatus includes a receiver configured to receive a probe request. The apparatus further includes a processor configured to generate a probe response in response to the probe request. The processor is further configured to conditionally include neighbor report information in the probe response based on an indication or absence of an indication in the probe request. The apparatus further includes a transmitter configured to transmit the probe response to a wireless device.

Another aspect of the present disclosure provides an apparatus configured to communicate in a high-efficiency wireless communication network. The apparatus includes a processor configured to determine whether neighborhood report information is stored. The apparatus further includes a transmitter configured to transmit a probe request conditionally including a request for neighbor report information based on said determine. The apparatus further includes a receiver configured to receive a probe response. The probe response includes the neighbor report information when the probe request includes the request for neighbor report information.

Another aspect of the present disclosure provides an apparatus configured to communicate in a high-efficiency wireless communication network. The apparatus includes a receiver configured to receive a probe request including shared wireless device state information. The apparatus further includes a memory configured to store the shared wireless device state information for at least a timeout period. The apparatus further includes a transmitter configured to transmit a probe response indicating the timeout period. The receiver is further configured to receive an association request omitting the wireless device state information within the timeout period.

Another aspect of the present disclosure provides an apparatus configured to communicate in a high-efficiency wireless communication network. The apparatus includes a transmitter configured to transmit a probe request including shared wireless device state information. The apparatus further includes a receiver configured to receive a probe response indicating a timeout period. The transmitter is further configured to transmit an association request omitting the wireless device state information within the timeout period.

Another aspect of the present disclosure provides an apparatus configured to communicate in a high-efficiency wireless communication network. The apparatus includes a receiver configured to receive a probe request from a wireless device. The apparatus further includes a transmitter configured to transmit a probe response including shared access point state information. The receiver is further configured to receive an association request including an indication that the wireless device has stored the shared access point state information. The transmitter is further configured to transmit an association response omitting the shared access point state information.

Another aspect of the present disclosure provides an apparatus configured to communicate in a high-efficiency wireless communication network. The apparatus includes a transmitter configured to transmit a probe request to an access point. The apparatus further includes a receiver configured to receive a probe response including shared access point state information. The apparatus further includes a memory configured to store the shared access point state information. The transmitter is further configured to transmit an association request including an indication that the wireless device has stored the shared access point state information. The receiver is further configured to receive an association response omitting the shared access point state information.

Another aspect of the present disclosure provides a non-transitory computer-readable medium. The medium includes code that, when executed, causes an apparatus to receive a probe request including a transmission power indication. The medium further includes code that, when executed, causes the apparatus to determine a received transmission power. The medium further includes code that, when executed, causes the apparatus to estimate a path-loss based on the transmission power indication and received transmission power. The medium further includes code that, when executed, causes the apparatus to transmit a first probe response at a first rate. The medium further includes code that, when executed, causes the apparatus to transmit a second probe response at a second rate when the access point does not receive an acknowledgement to the first probe response within a timeout period, the second rate being lower than the first rate.

Another aspect of the present disclosure provides a non-transitory computer-readable medium. The medium includes code that, when executed, causes an apparatus to transmit a probe request including a transmission power indication. The medium further includes code that, when executed, causes the apparatus to receive, from an access point, a probe response at either a first or second rate, the second rate being lower than the first rate. The medium further includes code that, when executed, causes the apparatus to transmit an acknowledgement to the probe response at either the first or second rate based on the rate of the probe response.

Another aspect of the present disclosure provides a non-transitory computer-readable medium. The medium includes code that, when executed, causes an apparatus to transmit one or more frames each including a transmission power indication. The medium further includes code that, when executed, causes the apparatus to receive a probe request at a first rate. The medium further includes code that, when executed, causes the apparatus to transmit a probe response at a second rate, the second rate being a function of the first rate.

Another aspect of the present disclosure provides a non-transitory computer-readable medium. The medium includes code that, when executed, causes an apparatus to receive one or more frames from an access point, each frame including a transmission power indication. The medium further includes code that, when executed, causes the apparatus to estimate a link quality based on the transmission power indication. The medium further includes code that, when executed, causes the apparatus to transmit a probe request at a first rate compatible with the estimated link quality. The medium further includes code that, when executed, causes the apparatus to receive a probe response at a second rate, the second rate being a function of the first rate.

Another aspect of the present disclosure provides a non-transitory computer-readable medium. The medium includes code that, when executed, causes an apparatus to receive a probe request. The medium further includes code that, when executed, causes the apparatus to generating a probe response in response to the probe request. The medium further includes code that, when executed, causes the apparatus to conditionally including neighbor report information in the probe response based on an indication or absence of an indication in the probe request. The medium further includes code that, when executed, causes the apparatus to transmit the probe response to a wireless device.

Another aspect of the present disclosure provides a non-transitory computer-readable medium. The medium includes code that, when executed, causes an apparatus to determine whether neighborhood report information is stored. The medium further includes code that, when executed, causes the apparatus to transmit a probe request conditionally including a request for neighbor report information based on said determine. The medium further includes code that, when executed, causes the apparatus to receive a probe response. The probe response includes the neighbor report information when the probe request includes the request for neighbor report information.

Another aspect of the present disclosure provides a non-transitory computer-readable medium. The medium includes code that, when executed, causes an apparatus to receive a probe request including shared wireless device state information. The medium further includes code that, when executed, causes the apparatus to store the shared wireless device state information for at least a timeout period. The medium further includes code that, when executed, causes the apparatus to transmit a probe response indicating the timeout period. The medium further includes code that, when executed, causes the apparatus to receive an association request omitting the wireless device state information within the timeout period.

Another aspect of the present disclosure provides a non-transitory computer-readable medium. The medium includes code that, when executed, causes an apparatus to transmit a probe request including shared wireless device state information. The medium further includes code that, when executed, causes the apparatus to receive a probe response indicating a timeout period. The medium further includes code that, when executed, causes the apparatus to transmit an association request omitting the wireless device state information within the timeout period.

Another aspect of the present disclosure provides a non-transitory computer-readable medium. The medium includes code that, when executed, causes an apparatus to receive a probe request from a wireless device. The medium further includes code that, when executed, causes the apparatus to transmit a probe response including shared access point state information. The medium further includes code that, when executed, causes the apparatus to receive an association request including an indication that the wireless device has stored the shared access point state information. The medium further includes code that, when executed, causes the apparatus to transmit an association response omitting the shared access point state information.

Another aspect of the present disclosure provides a non-transitory computer-readable medium. The medium includes code that, when executed, causes an apparatus to transmit a probe request to an access point. The medium further includes code that, when executed, causes the apparatus to receive a probe response including shared access point state information. The medium further includes code that, when executed, causes the apparatus to store the shared access point state information. The medium further includes code that, when executed, causes the apparatus to transmit an association request including an indication that the wireless device has stored the shared access point state information. The medium further includes code that, when executed, causes the apparatus to receive an association response omitting the shared access point state information.

DETAILED DESCRIPTION

Figure 1:
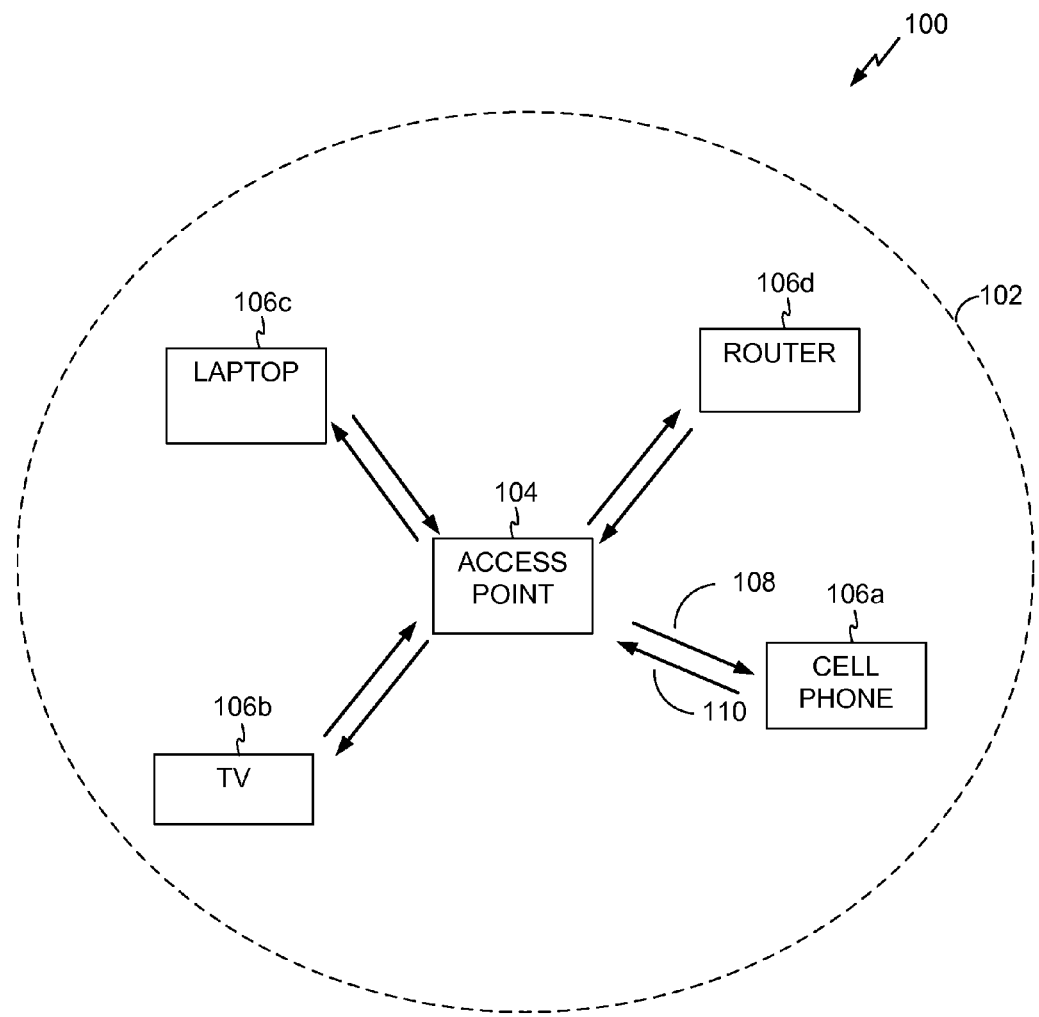
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing the high-efficiency 802.11 protocol using the techniques disclosed herein may include allowing for increased peer-to-peer services (e.g., Miracast, WiFi Direct Services, Social WiFi, etc.) in the same area, supporting increased per-user minimum throughput requirements, supporting more users, providing improved outdoor coverage and robustness, and/or consuming less power than devices implementing other wireless protocols.

In some implementations, a WLAN includes various devices which are the components that access the wireless network. For example, there may be two types of devices: access points ("APs") and clients (also referred to as stations, or "STAs"). In general, an access point may serve as a hub or base station for the WLAN and an wireless device serves as a user of the WLAN. For example, an wireless device may be a laptop computer, a personal digital assistant (PDA), a mobile phone, etc. In an example, an wireless device connects to an access point via a WiFi (e.g., IEEE 802.11 protocol) compliant wireless link to obtain general connectivity to the Internet or to other wide area networks. In some implementations an wireless device may also be used as an access point.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, in various embodiments, a large amount of channel time can be consumed by beacons and probe responses. This can be particularly true in dense networks. In one embodiment disclosed here, channel time can be reduced by transmitting frames such as probe responses at a high rate. In some embodiments, the rate at which the probe responses are sent can be selected via a rate function described herein. In a third embodiment, channel time can be reduced by omitting neighbor information in frames such as beacons and probe responses unless requested by a station. A fourth embodiment reduces channel time by omitting at least some data shared between probe requests and association requests. In a fifth embodiment, channel time may be reduced by omitting at least some data shared between probe responses and association responses. The reduced channel time provided by the embodiment disclosed herein can result in increased overall network efficiency.

FIG. 1 shows an exemplary wireless communication system 100 in which aspects of the present disclosure may be employed. The wireless communication system 100 may operate pursuant to a wireless standard, for example a high-efficiency 802.11 standard. The wireless communication system 100 may include an access point 104, which communicates with wireless devices 106.

A variety of processes and methods may be used for transmissions in the wireless communication system 100 between the access point 104 and the wireless devices 106. For example, signals may be sent and received between the access point 104 and the wireless devices 106 in accordance with OFDM/OFDMA techniques. If this is the case, the wireless communication system 100 may be referred to as an OFDM/OFDMA system. Alternatively, signals may be sent and received between the access point 104 and the wireless devices 106 in accordance with code division multiple access (CDMA) techniques. If this is the case, the wireless communication system 100 may be referred to as a CDMA system.

A communication link that facilitates transmission from the access point 104 to one or more of the wireless devices 106 may be referred to as a downlink (DL) 108, and a communication link that facilitates transmission from one or more of the wireless devices 106 to the access point 104 may be referred to as an uplink (UL) 110. Alternatively, a downlink 108 may be referred to as a forward link or a forward channel, and an uplink 110 may be referred to as a reverse link or a reverse channel.

The access point 104 may act as a base station and provide wireless communication coverage in a basic service area (BSA) 102. The access point 104 along with the wireless devices 106 associated with the access point 104 and that use the access point 104 for communication may be referred to as a basic service set (BSS). It should be noted that the wireless communication system 100 may not have a central access point 104, but rather may function as a peer-to-peer network between the wireless devices 106. Accordingly, the functions of the access point 104 described herein may alternatively be performed by one or more of the wireless devices 106.

In some aspects, a wireless device 106 may be required to associate with the access point 104 in order to send communications to and/or receive communications from the access point 104. In one aspect, information for associating is included in a broadcast by the access point 104. To receive such a broadcast, the wireless device 106 may, for example, perform a broad coverage search over a coverage region. A search may also be performed by the wireless device 106 by sweeping a coverage region in a lighthouse fashion, for example. After receiving the information for associating, the wireless device 106 may transmit a reference signal, such as an association probe or request, to the access point 104. In some aspects, the access point 104 may use backhaul services, for example, to communicate with a larger network, such as the Internet or a public switched telephone network (PSTN).

Figure 2:
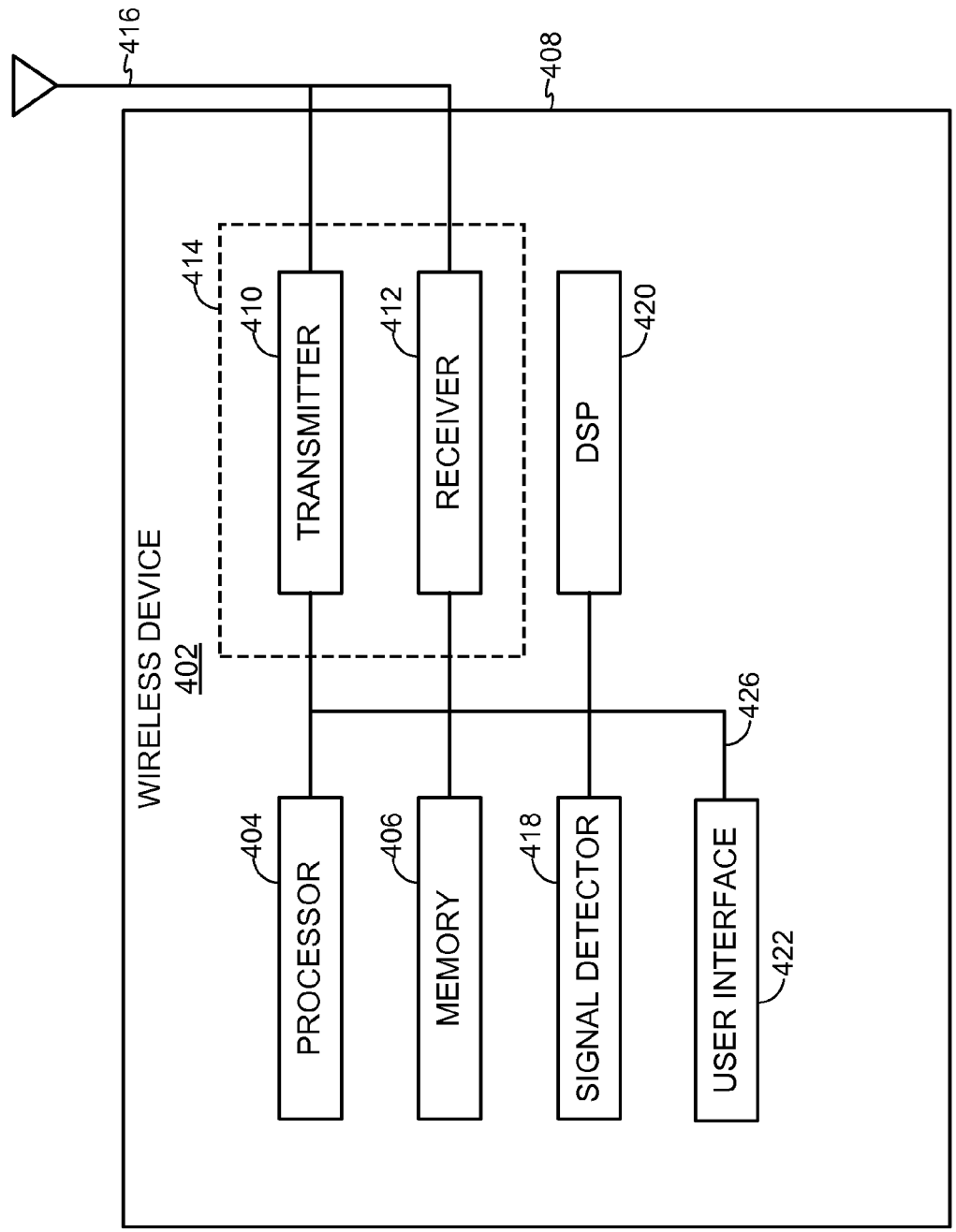
FIG. 2 shows a functional block diagram of an exemplary wireless device that may be employed within the wireless communication systems of FIG. 1.

FIG. 2 shows an exemplary functional block diagram of a wireless device 402 that may be employed within the wireless communication systems 100 of FIG. 1. The wireless device 402 is an example of a device that may be configured to implement the various methods described herein. For example, the wireless device 402 may comprise the access point 104, one of the wireless devices 106.

The wireless device 402 may include a processor 404 which controls operation of the wireless device 402. The processor 404 may also be referred to as a central processing unit (CPU). Memory 406, which may include both read-only memory (ROM) and random access memory (RAM), may provide instructions and data to the processor 404. A portion of the memory 406 may also include non-volatile random access memory (NVRAM). The processor 404 typically performs logical and arithmetic operations based on program instructions stored within the memory 406. The instructions in the memory 406 may be executable to implement the methods described herein.

The processor 404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 402 may also include a housing 408 that may include a transmitter 410 and/or a receiver 412 to allow transmission and reception of data between the wireless device 402 and a remote location. The transmitter 410 and receiver 412 may be combined into a transceiver 414. An antenna 416 may be attached to the housing 408 and electrically coupled to the transceiver 414. The wireless device 402 may also include (not shown) multiple transmitters, multiple receivers, multiple transceivers, and/or multiple antennas.

The wireless device 402 may also include a signal detector 418 that may be used in an effort to detect and quantify the level of signals received by the transceiver 414. The signal detector 418 may detect such signals as total energy, energy per subcarrier per symbol, power spectral density and other signals. The wireless device 402 may also include a digital signal processor (DSP) 420 for use in processing signals. The DSP 420 may be configured to generate a packet for transmission. In some aspects, the packet may comprise a physical layer data unit (PPDU).

The wireless device 402 may further comprise a user interface 422 in some aspects. The user interface 422 may comprise a keypad, a microphone, a speaker, and/or a display. The user interface 422 may include any element or component that conveys information to a user of the wireless device 402 and/or receives input from the user.

The various components of the wireless device 402 may be coupled together by a bus system 426. The bus system 426 may include a data bus, for example, as well as a power bus, a control signal bus, and a status signal bus in addition to the data bus. Those of skill in the art will appreciate the components of the wireless device 402 may be coupled together or accept or provide inputs to each other using some other mechanism.

Although a number of separate components are illustrated in FIG. 2, those of skill in the art will recognize that one or more of the components may be combined or commonly implemented. For example, the processor 404 may be used to implement not only the functionality described above with respect to the processor 404, but also to implement the functionality described above with respect to the signal detector 418 and/or the DSP 420. Further, each of the components illustrated in FIG. 2 may be implemented using a plurality of separate elements.

The wireless device 402 may comprise an access point 104, a wireless device 106, an access point 254, a wireless device 256, and/or an access point 304, and may be used to transmit and/or receive communications. That is, either the access point 104, wireless device 106, access point 254, wireless device 256, or access point 304 may serve as transmitter or receiver devices. Certain aspects contemplate signal detector 418 being used by software running on memory 406 and processor 404 to detect the presence of a transmitter or receiver.

Rate Selection Via Acknowledgement

As discussed above, in various embodiments, a large amount of channel time can be consumed by beacons and probe responses. This can be particularly true in dense networks. In one embodiment, channel time can be reduced by transmitting frames such as probe responses at a high rate. In some embodiments, a highest functioning modulation and coding scheme (MCS) can be determined. Reduced channel time can increase overall network efficiency. In some embodiments, the rate can be selected via probe response and acknowledgement system described herein.

Figure 3:
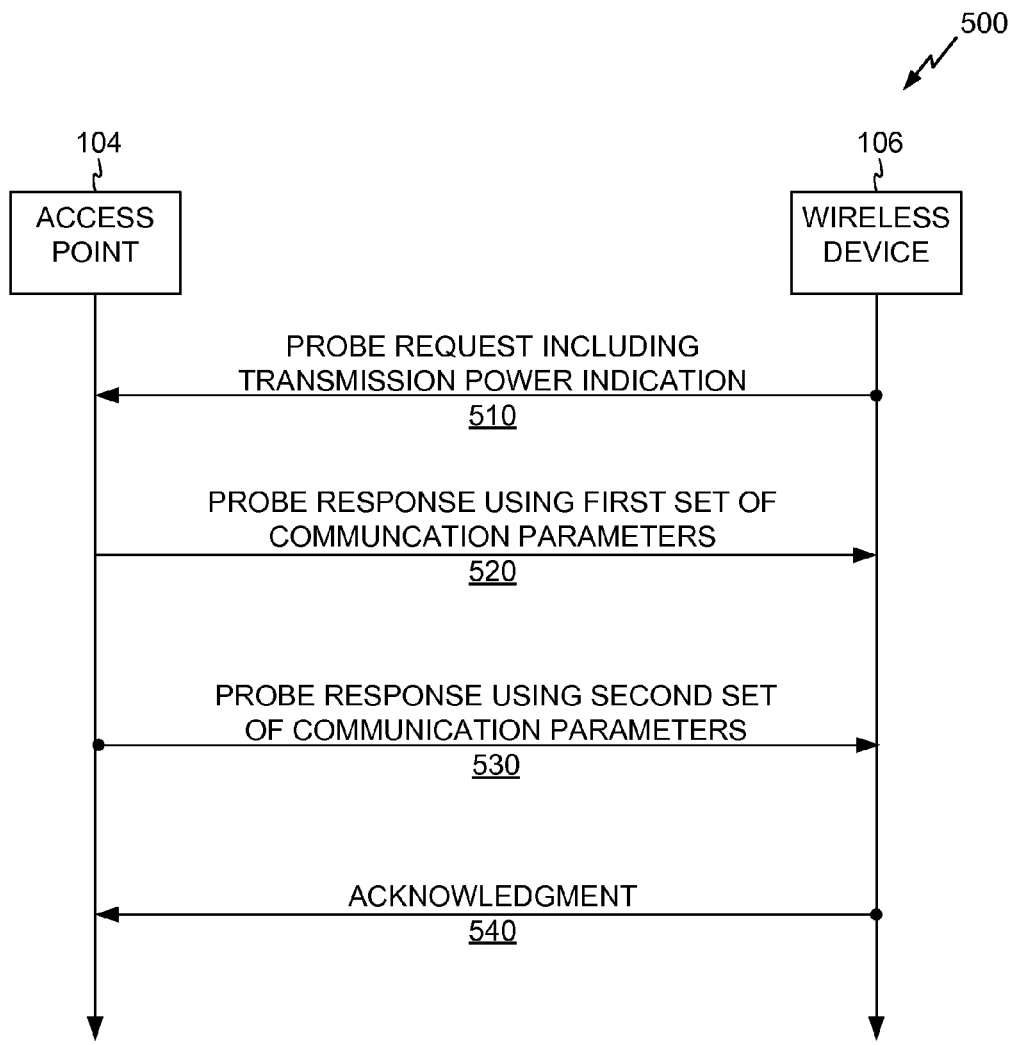
FIG. 3 shows an embodiment of the wireless communication system in which aspects of the present disclosure may be employed.

FIG. 3 shows an embodiment of the wireless communication system 500 in which aspects of the present disclosure may be employed. As shown, the wireless communication system 500 includes the access point 104 and a wireless device 106. The wireless communication system 500 can be similar to the wireless communication system 100, described above with respect to FIG. 1. For example, the access point 104 can include the access point 104 shown in FIG. 1, and the wireless device 106 can include any of the wireless devices 106a-106d shown in FIG. 1. In various embodiments, the access point 104 and/or the wireless device 106 can include the wireless device 402 (FIG. 2) or any other suitable device.

FIG. 3 illustrates an exemplary communication exchange between the access point 104 and the wireless device 106. In the illustrated communication exchange, the access point 104 is configured to determine a communication rate. For example, the access point 104 can be configured to determine a highest effective MCS. Although the illustrated communications are shown and described herein with reference to a particular order, in various embodiments, communication herein can be performed in a different order, or omitted, and additional communications can be added.

First, the wireless device 106 transmits a probe request 510. The probe request 510 includes a transmission power indication. In some embodiments, the probe request 510 further includes one or more additional indications of the wireless device's 106 capabilities. For example, the probe request 510 can include a number of transmit and/or receive antennas on the wireless device 106.

The access point 104 can determine a received transmission power based on the probe request 510. The access point 104 can further estimate a path-loss based on one or more of the transmission power indication, the received transmission power, and the indications of the wireless device's 106 capabilities. The access point 104 can determine a first set of communication parameters based on the probe request and the received power indication. The communication parameters may control how a particular transmission occurs between the access point and a destination device. For example, the access point 104 can determine a first data rate or MCS at which to transmit a probe response. The first data rate or MCS can be based on the estimated path-loss.

Then, the access point 104 transmits a first probe response 520 using or based on a first set of communication parameters defining a first data rate or MCS. In some embodiments, the first data rate or MCS is not compatible with network characteristics and the wireless device 106 does not receive the first probe response 520. In other embodiments, the first data rate or MCS is compatible with network characteristics and the wireless device 106 can receive the first probe response 520 (not shown).

The access point 104 can wait for a timeout period for the wireless device 106 to acknowledge the first probe response 520. In embodiments where the wireless device 106 receives the first probe response 520, the wireless device 106 can acknowledge the first probe response 520 using the first set of communication parameters within the timeout period. In embodiments where in embodiments where the wireless device 106 does not acknowledge the first probe response 520 within the timeout period, the access point 104 can select a second set of communication parameters, defining a second data rate or MCS.

Next, the access point 104 can transmit a second probe response 530 using the second set of communication parameters. In various embodiments, the second data rate defined by the second set of communication parameters can be lower than the first data rate. In some embodiments, the second data rate can be a next lowest available rate or MCS after the first data rate. In the illustrated embodiment, the wireless device 106 receives the second probe response 530. In other embodiments where the wireless device 106 does not receive or acknowledge probe responses, the access point 104 can continue to send successive probe responses using third, fourth, and fifth sets of communication parameters, each defining successively lower rates or MCSs, for example up to a threshold number of responses.

Thereafter, the wireless device 106 acknowledges the second probe response 530. The wireless device 106 can acknowledge the second probe response 530 using a media access control (MAC)-level acknowledgement. In various embodiments, the wireless device 106 can use the second set of communication parameters for the acknowledgement and/or successive communications with the access point 104. Likewise, the access point 104 can continue to use the second set of communication parameters for successive communications with the wireless device 106.

Figure 4:
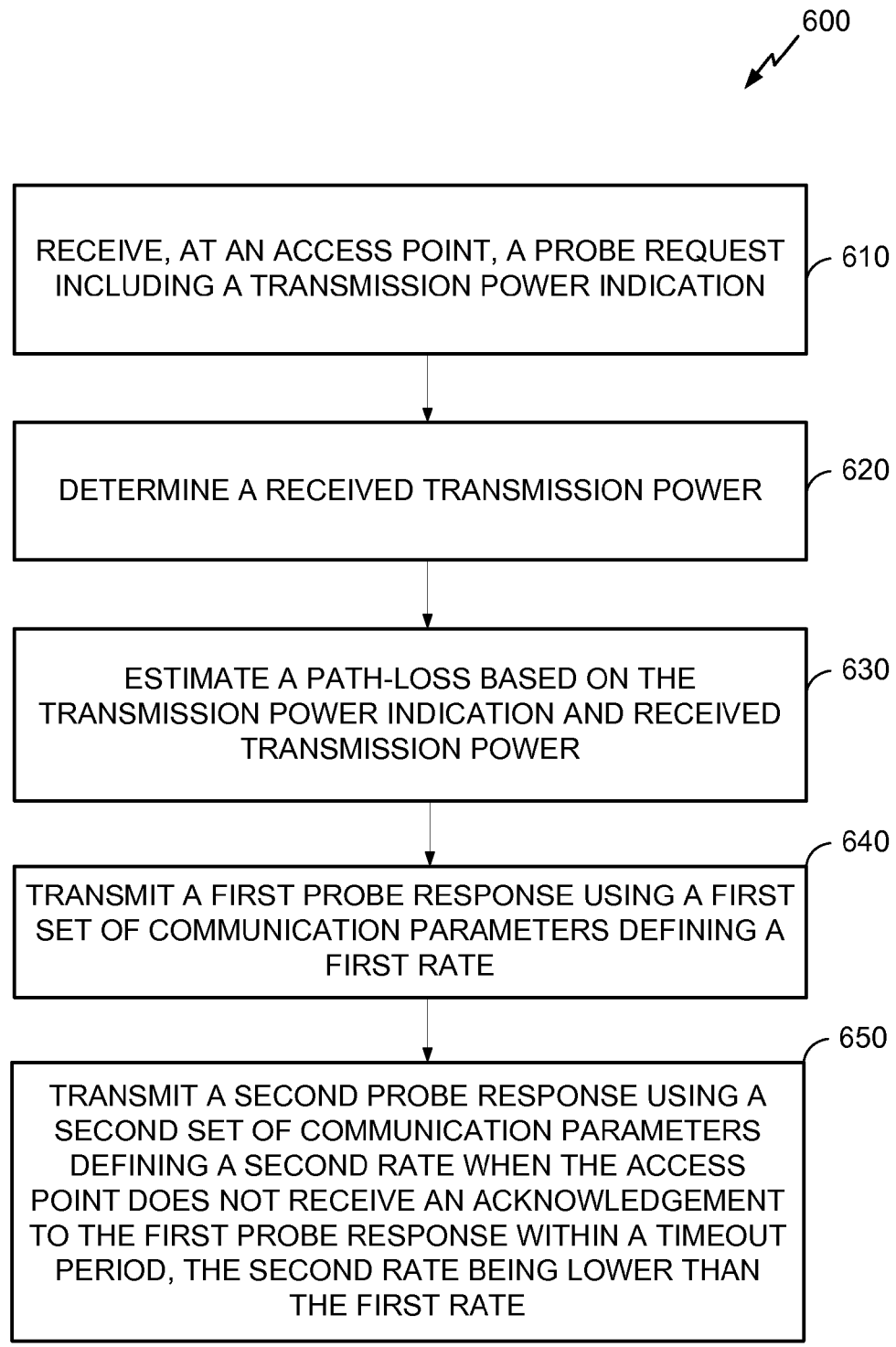
FIG. 4 shows a flowchart for an exemplary method of wireless communication that can be employed within the wireless communication system of FIG. 3.
Figure 5:
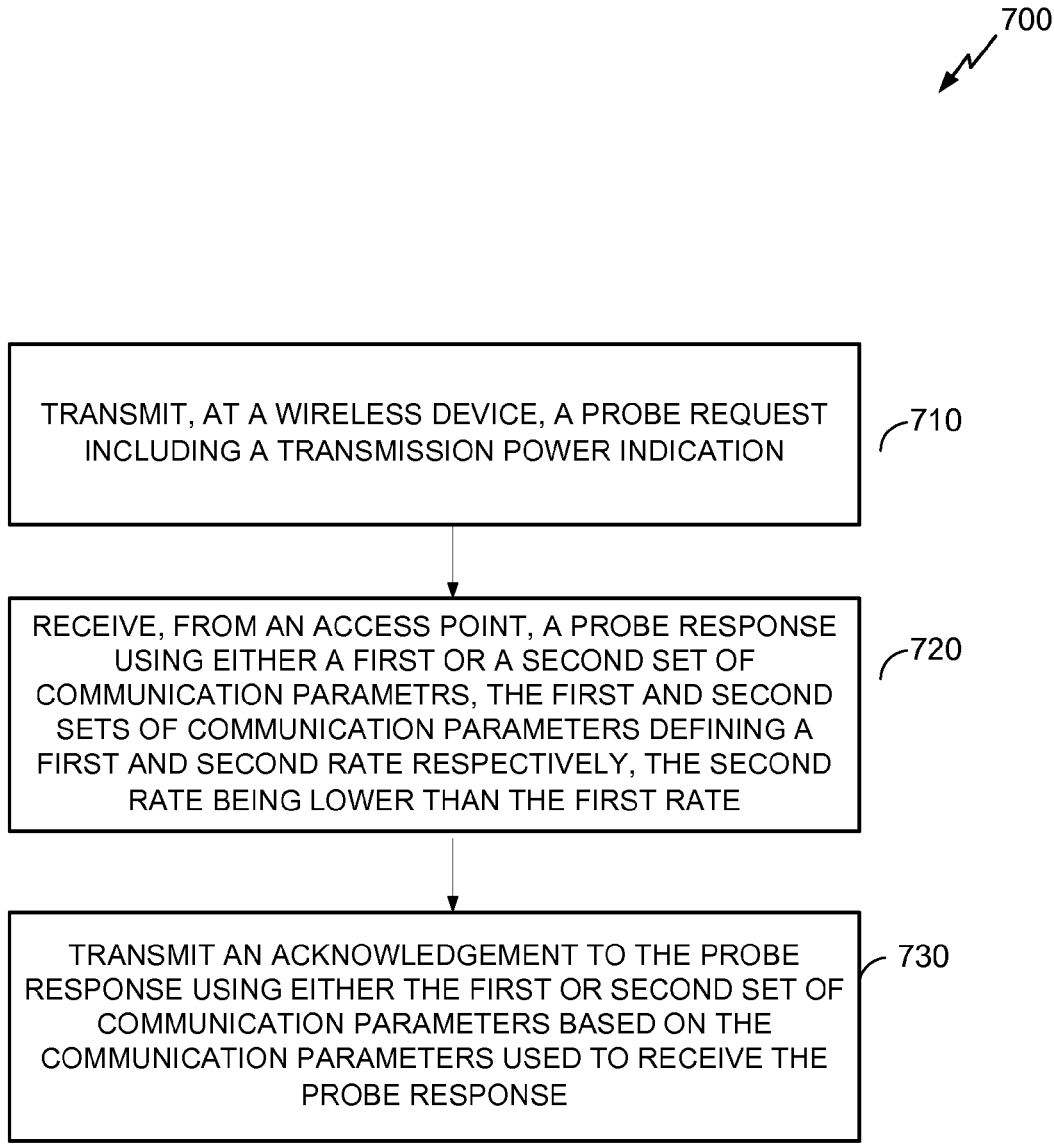
FIG. 5 shows a flowchart for an exemplary method of wireless communication that can be employed within the wireless communication system of FIG. 3.

FIG. 4 shows a flowchart 600 for an exemplary method of wireless communication that can be employed within the wireless communication system 500 of FIG. 5. The method can be implemented in whole or in part by the devices described herein, such as the wireless device 402 shown in FIG. 2. Although the illustrated method is described herein with reference to the wireless communication system 60 discussed above with respect to FIG. 1, the wireless communication systems 500 discussed above with respect to FIG. 3, and the wireless device 402 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

Method 600 may be used by one of two communicating wireless devices. The method 600 may provide for one of the devices to determine communication parameters for transmission between the two devices that improve utilization of the wireless medium compared to known methods. For example, use of the method 600 may allow a device to determine a set of communication parameters used to transmit a probe response that improve network utilization of the transmission of the probe response. This determined set of communication parameters may then be applied to other types of frames as well, resulting in a further improvement to network utilization.

First, at block 610, an access point receives a probe request including a transmission power indication. For example, the access point 104 can receive the probe request 510 from the wireless device 106. The probe request may be decoded by the access point to determine the transmission power indication. In various embodiments, the probe request can further include one or more receive capability indications such as, for example, a number of antennas of the wireless device 106. The access point may further decode the probe request to determine one or more of the included receive capability indications.

Then, at block 620, the access point determines a received transmission power. For example, the access point 104 can determine a received transmission power for the probe request 510.

Next, at block 630, the access point estimates a path-loss based on the transmission power indication and received transmission power. For example, the access point 104 can determine a path-loss to the wireless device 106 based on the probe request 510. In some embodiments, the access point can estimate the path-loss further based on the one or more receive capability indications, such as the number of antennas of the wireless device 10 in some aspects.

Then, at block 640, the access point transmits a first probe response using or based on a first set of communication parameters defining a first data rate. For example, the access point 104 can transmit the first probe response 520 to the wireless device 106 at the first data rate based on the estimated path loss. In some aspects, the first set of communication parameters define a first modulation coding scheme (MCS).

Subsequently, at block 650, the access point transmits a second probe response using or based on a second set of communication parameters defining a second data rate when the access point does not receive an acknowledgement to the first probe response within a timeout period. In some aspects, the acknowledgment message that the access point is waiting for is a media access control (MAC) level acknowledgment.

The second data rate is lower than the first data rate. For example, the access point 104 can transmit the second probe response 530 to the wireless device 106 at the second data rate. In an embodiment, the second data rate can be a next lowest MCS from the first data rate.

As discussed above, in various embodiments, the access point can continue to retransmit probe responses using third, fourth, or fifth sets of communication parameters, each set of communication parameters defining successively lower rates, for example up to a maximum number of retransmissions until an acknowledgment is received. If and when the wireless device 106 acknowledges a probe response, the access point 104 and/or the wireless device 106 can select the set of communication parameters that resulted in successful acknowledgment for further communication. For example in some aspects, the rate used to transmit the acknowledged probe response may be selected for further communication with the device.

In an embodiment, the method shown in FIG. 4 can be implemented in a wireless device that can include a receiving circuit, a determining circuit, an estimating circuit, and a transmitting circuit. Those skilled in the art will appreciate that a wireless device can have more components than the simplified wireless device described herein. The wireless device described herein includes only those components useful for describing some prominent features of implementations within the scope of the claims.

The receiving circuit can be configured to receive the probe request. In some embodiments, the receiving circuit can be configured to perform at least block 610 of FIG. 4. The receiving circuit can include one or more of the processor 404 (FIG. 2), the receiver 412 (FIG. 2), the antenna 416 (FIG. 2), and the transceiver 414 (FIG. 2). In some implementations, means for receiving can include the receiving circuit.

The determining circuit can be configured to determine the received transmission power. In some embodiments, the determining circuit can be configured to perform at least block 620 of FIG. 4. The determining circuit can include one or more of the processor 404 (FIG. 2), the DSP 420, the signal detector 418 (FIG. 2), the receiver 412 (FIG. 2), and the memory 406 (FIG. 2). In some implementations, means for determining can include the determining circuit.

The estimating circuit can be configured to estimate the path-loss. In some embodiments, the estimating circuit can be configured to perform at least block 630 of FIG. 4. The estimating circuit can include one or more of the processor 404 (FIG. 2), the DSP 420, the signal detector 418 (FIG. 2), the receiver 412 (FIG. 2), and the memory 406 (FIG. 2). In some implementations, means for estimating can include the estimating circuit.

The transmitting circuit can be configured to transmit the probe responses. In some embodiments, the transmitting circuit can be configured to perform at least blocks 640 and/or 650 of FIG. 4. The transmitting circuit can include one or more of the processor 404 (FIG. 2), the transmitter 410 (FIG. 2), the antenna 416 (FIG. 2), and the transceiver 414 (FIG. 2). In some implementations, means for transmitting can include the transmitting circuit.

Method 700 may be used by one of two communicating wireless devices. The method 700 may provide for one of the devices to determine communication parameters for transmission between the two devices that improve utilization of the wireless medium compared to known methods. For example, use of the method 700 may allow a device to determine a set of communication parameters used to transmit a probe response that improve network utilization of the transmission of the probe response. This determined set of communication parameters may then be applied to other types of frames as well, resulting in a further improvement to network utilization.

FIG. 5 shows a flowchart 700 for an exemplary method of wireless communication that can be employed within the wireless communication system 500 of FIG. 3. The method can be implemented in whole or in part by the devices described herein, such as the wireless device 402 shown in FIG. 2. Although the illustrated method is described herein with reference to the wireless communication system 70 discussed above with respect to FIG. 1, the wireless communication systems 500 discussed above with respect to FIG. 3, and the wireless device 402 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 710, a wireless device transmits a probe request. The probe request includes a transmission power indication. For example, the wireless device 106 can transmit the probe request 510 to the access point 104. In some embodiments, the probe request can include one or more receive capabilities of the wireless device. For example, the probe request may include a receive capability indicating the number of antennas present on the wireless device.

Then, at block 720, the wireless device receives a probe response using either a first set of communication parameters defining a first data rate or a second set of communication parameters defining a second data rate. For example, the wireless device 106 can receive either the first probe response 520 or the second probe response 530 from the access point 104. The first and/or second sets of communication parameters can define an MCS.

Subsequently, at block 730, the wireless device transmits an acknowledgement to the probe response using either the first or second set of communication parameters based on the communication parameters used to receive the probe response. In some aspects, the transmitted acknowledgment is a media access control (MAC) level acknowledgment.

In some aspects, the wireless device 106 can transmit the acknowledgement 540 to the access point 104 using the second set of communication parameters when the wireless device 106 receives the second probe response 530 using the second set of communication parameters. In embodiments where the wireless device 106 receives the first probe response 520 using the first set of communication parameters, the wireless device 106 can transmit the acknowledgement to the access point 104 using the first set of communication parameters.

In an embodiment, the method shown in FIG. 5 can be implemented in a wireless device that can include a transmitting circuit and a receiving circuit. Those skilled in the art will appreciate that a wireless device can have more components than the simplified wireless device described herein. The wireless device described herein includes only those components useful for describing some prominent features of implementations within the scope of the claims.

The transmitting circuit can be configured to transmit the probe request and/or acknowledgement. In some embodiments, the transmitting circuit can be configured to perform at least blocks 710 and/or 730 of FIG. 5. The transmitting circuit can include one or more of the processor 404 (FIG. 2), the transmitter 410 (FIG. 2), the antenna 416 (FIG. 2), and the transceiver 414 (FIG. 2). In some implementations, means for transmitting can include the transmitting circuit.

The receiving circuit can be configured to receive the probe response. In some embodiments, the receiving circuit can be configured to perform at least block 720 of FIG. 5. The receiving circuit can include one or more of the processor 404 (FIG. 2), the receiver 412 (FIG. 2), the antenna 416 (FIG. 2), and the transceiver 414 (FIG. 2). In some implementations, means for receiving can include the receiving circuit.

Rate Selection Via Function

As discussed above, in various embodiments, a large amount of channel time can be consumed by beacons and probe responses. This can be particularly true in dense networks. In one embodiment, channel time can be reduced by transmitting frames such as probe responses at a high rate. In some embodiments, a highest functioning modulation and coding scheme (MCS) can be determined. Reduced channel time can increase overall network efficiency. In some embodiments, the rate can be selected via probe request and response function described herein.

Figure 6:
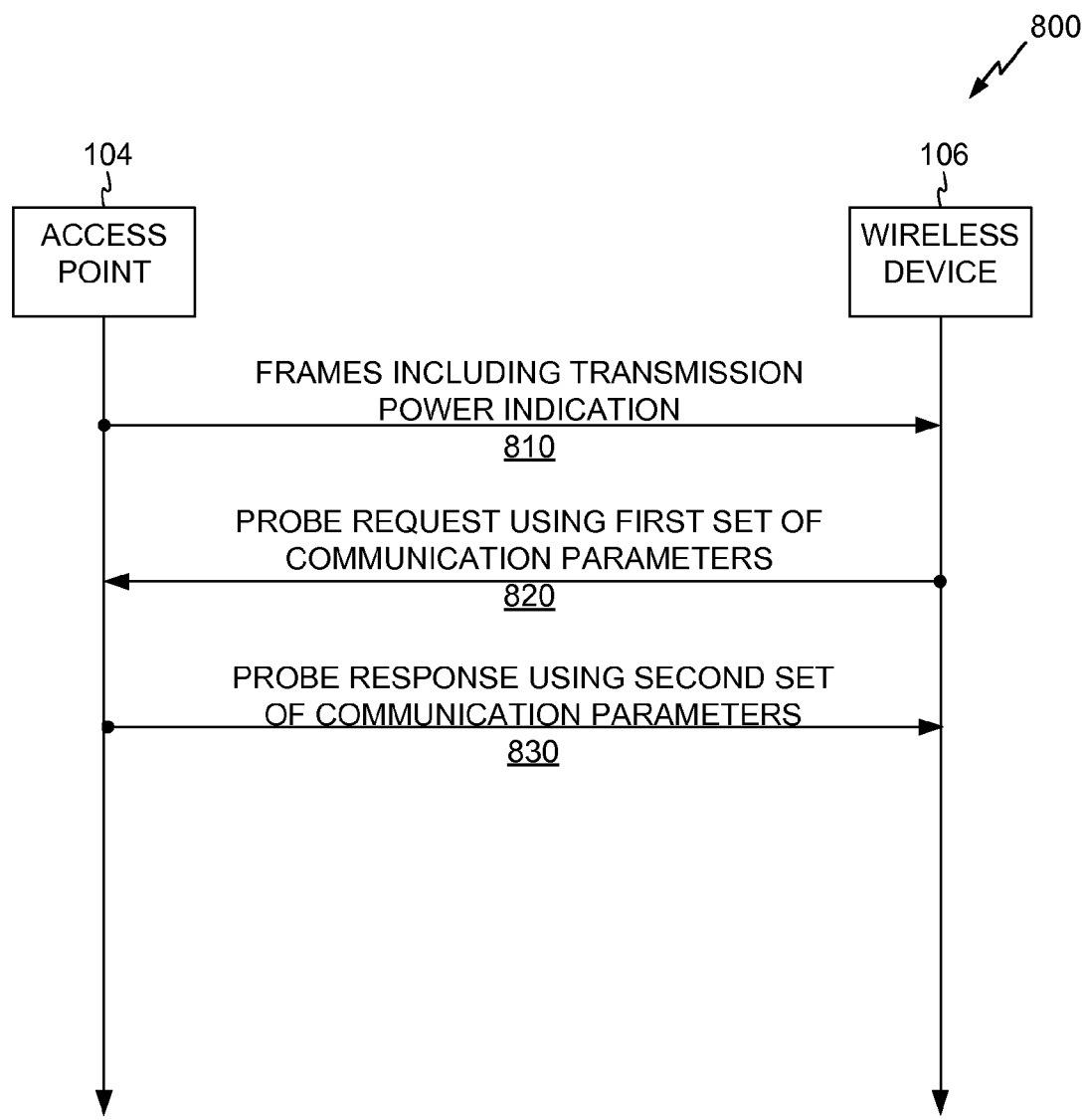
FIG. 6 shows an embodiment of the wireless communication system in which aspects of the present disclosure may be employed.

FIG. 6 shows an embodiment of the wireless communication system 800 in which aspects of the present disclosure may be employed. As shown, the wireless communication system 800 includes the access point 104 and a wireless device 106. The wireless communication system 800 can be similar to the wireless communication system 100, described above with respect to FIG. 1. For example, the access point 104 can include the access point 104 shown in FIG. 1, and the wireless device 106 can include any of the wireless devices 106a-106d shown in FIG. 1. In various embodiments, the access point 104 and/or the wireless device 106 can include the wireless device 402 (FIG. 2) or any other suitable device.

FIG. 6 illustrates an exemplary communication exchange between the access point 104 and the wireless device 106. In the illustrated communication exchange, the access point 104 is configured to determine a communication rate. For example, the access point 104 can be configured to determine a highest effective MCS. Although the illustrated communications are shown and described herein with reference to a particular order, in various embodiments, communication herein can be performed in a different order, or omitted, and additional communications can be added.

First, the access point 104 transmits one or more frames 810 each including a transmission power indication. In some embodiments, one or more frames 810 can each further include one or more additional indications of the access point 104 capabilities. For example, the frames 810 can include a number of transmit and/or receive antennas on the access point 104.

The wireless device 106 can determine a received transmission power based on the frames 810. The wireless device 106 can further estimate a path-loss based on one or more of the transmission power indication, the received transmission power, and the indications of the Aps 104 capabilities. The wireless device 106 can determine a first set of communication parameters at which to transmit the probe request. For example, the wireless device 106 can determine a first coding rate or MCS at which to transmit a probe request. The first data rate or MCS can be based on the estimated path-loss. Then, the wireless device 106 transmits a probe request 820 using the first set of communication parameters.

Next, the access point 104 can transmit a probe response 830 using or based on a second set of communication parameters. For example, the probe response 830 may be transmitted at a second coding rate or MCS. In various embodiments, the second set of communication parameters can be a function of the first set of communication parameters. For example, the second set of communication parameters can be a direct mapping of the second set of communication parameters to the first set of communication parameters. In some embodiments, the function can indicate that a second data rate of the second set of communication parameters may be less than or equal to a first data rate defined by the first set of communication parameters. In some embodiments, the function can include additional factors such as one or more of: a transmit power indication, a transmit power measurement, a receive power indication, and a receive power measurement. In some embodiments, the second set of communication parameters can be equal to the first set of communication parameters for certain communication parameters.

Figure 7:
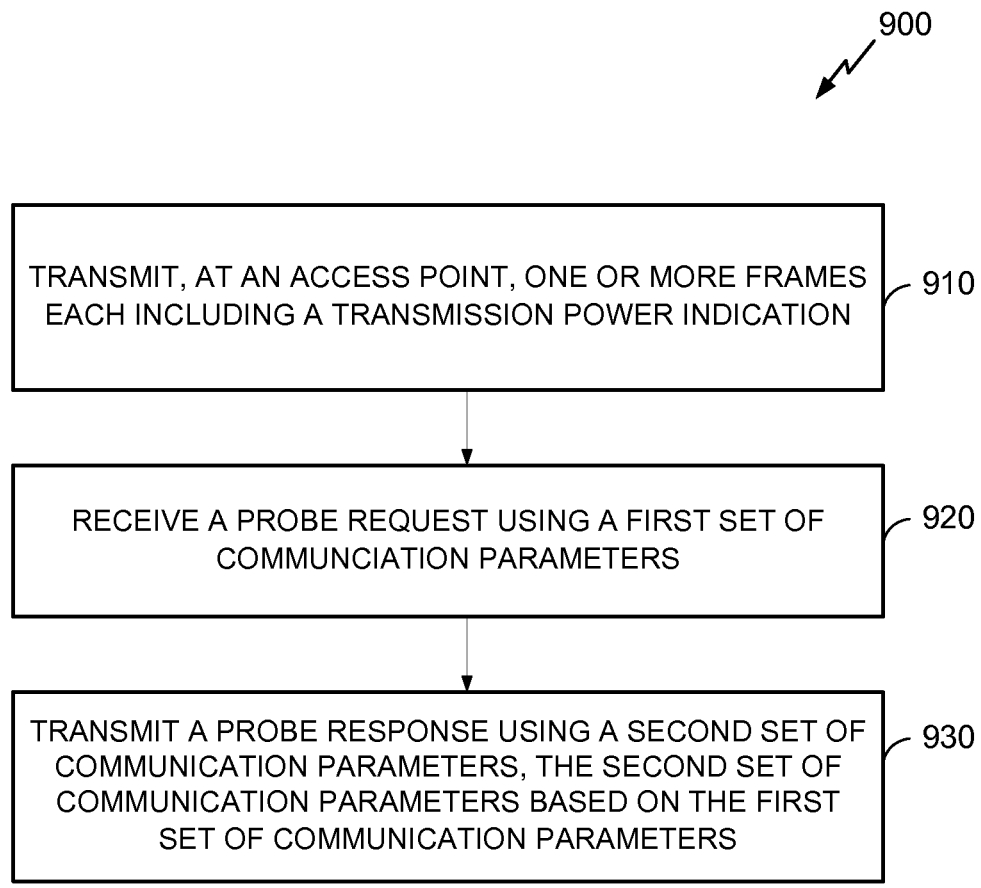
FIG. 7 shows a flowchart for an exemplary method of wireless communication that can be employed within the wireless communication system of FIG. 6.

FIG. 7 shows a flowchart 900 for an exemplary method of wireless communication that can be employed within the wireless communication system 800 of FIG. 6. The method can be implemented in whole or in part by the devices described herein, such as the wireless device 402 shown in FIG. 2. Although the illustrated method is described herein with reference to the wireless communication system 100 discussed above with respect to FIG. 1, the wireless communication systems 800 discussed above with respect to FIG. 6, and the wireless device 402 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

In some aspects, the method 900 is used by one of two communicating devices to jointly determine communication parameters appropriate for the quality of the link between the two devices. This may provide for increased transmission speeds and therefore more efficient utilization of a wireless medium bandwidth in some aspects. For example, by some aspects determining an MCS based on a plurality of frames transmitted from one device to another, an MCS used to exchange probe requests and responses between the two devices may be increased relate to a MCS that may be used in known methods. As probe traffic can comprise a significant percentage of wireless traffic on some networks, increasing the MCS used to transmit probe messages may improve utilization of the wireless medium when compared to known methods.

First, at block 910, the access point transmits one or more frames. Each frame includes a transmission power indication. The frames can include, for example, beacons, short beacons, broadcast frames, probe responses, etc. For example, the access point 104 can transmit one or more beacon frames to the wireless device 106.

Next, at block 920, the access point receives a probe request using or based on a first set of communication parameters. The first set of communication parameters may control how the receive process of block 920 is performed. For example, the first set of communication parameters may define an MCS used to receive the probe request. The MCS may define a coding rate used to receive the probe request. The access point 104 can receive the probe request 820 from the wireless device 106. In some embodiments, the access point 104 can determine a second set of communication parameters based on the first set of communication parameters, for example according to a function as discussed above.

Then, at block 930, the access point transmits a probe response using or based on a second set of communication parameters. For example, the access point 104 can transmit the probe response 830 to the wireless device 106. In various embodiments, the access point 104 can continue to use the second set of communication parameters for future communications with the wireless device 106.

In an embodiment, the method shown in FIG. 7 can be implemented in a wireless device that can include a transmitting circuit and a receiving circuit. Those skilled in the art will appreciate that a wireless device can have more components than the simplified wireless device described herein. The wireless device described herein includes only those components useful for describing some prominent features of implementations within the scope of the claims.

The transmitting circuit can be configured to transmit the one or more frames. In some embodiments, the transmitting circuit can be configured to perform at least blocks 910 and/or 930 of FIG. 7. The transmitting circuit can include one or more of the processor 404 (FIG. 2), the transmitter 410 (FIG. 2), the antenna 416 (FIG. 2), and the transceiver 414 (FIG. 2). In some implementations, means for transmitting can include the transmitting circuit.

The receiving circuit can be configured to receive the probe request. In some embodiments, the receiving circuit can be configured to perform at least block 920 of FIG. 7. The receiving circuit can include one or more of the processor 404 (FIG. 2), the receiver 412 (FIG. 2), the antenna 416 (FIG. 2), and the transceiver 414 (FIG. 2). In some implementations, means for receiving can include the receiving circuit.

Figure 8:
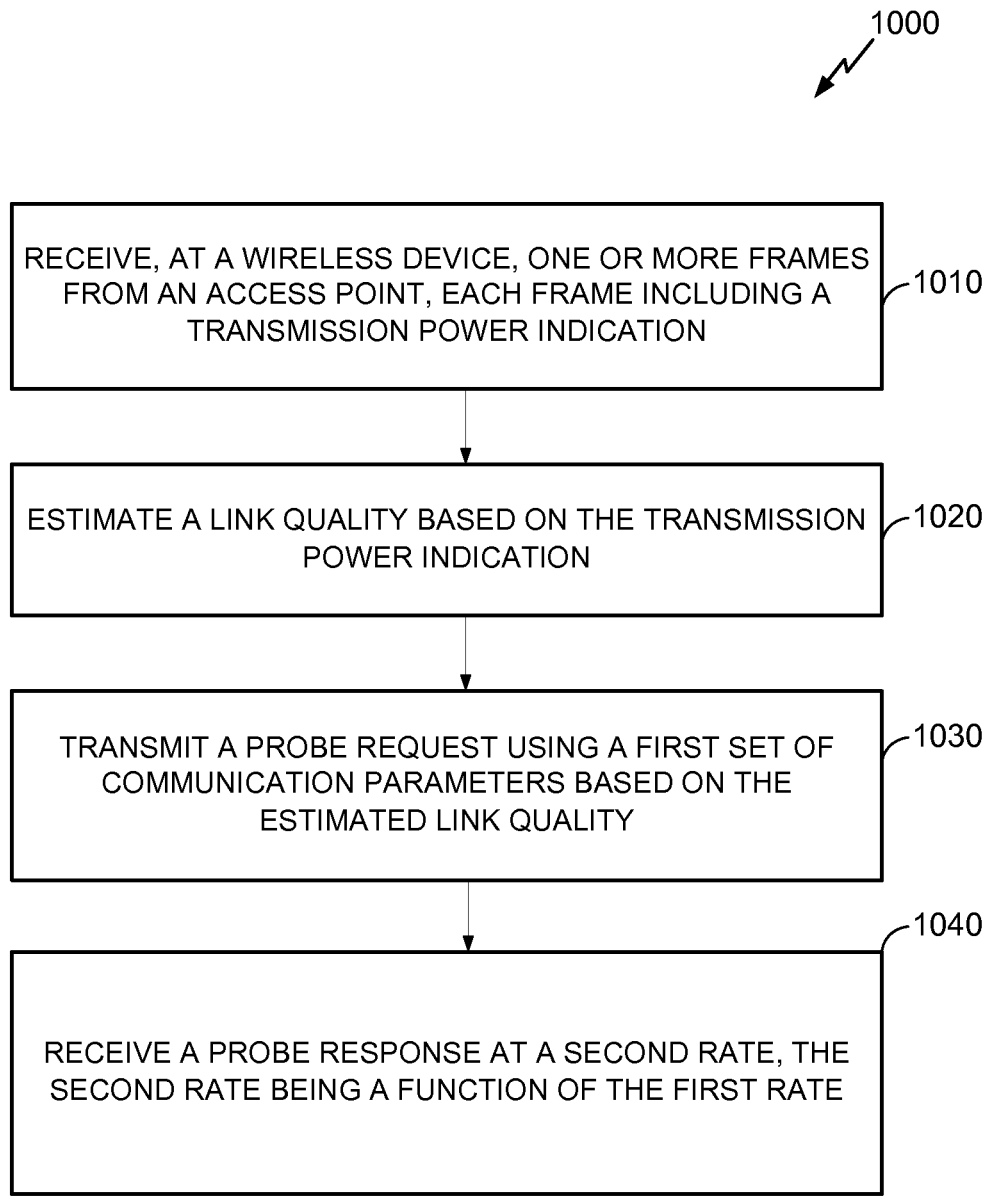
FIG. 8 shows a flowchart for an exemplary method of wireless communication that can be employed within the wireless communication system of FIG. 6.

FIG. 8 shows a flowchart 1000 for an exemplary method of wireless communication that can be employed within the wireless communication system 800 of FIG. 6. The method can be implemented in whole or in part by the devices described herein, such as the wireless device 402 shown in FIG. 2. Although the illustrated method is described herein with reference to the wireless communication system 100 discussed above with respect to FIG. 1, the wireless communication systems 800 discussed above with respect to FIG. 6, and the wireless device 402 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

In some aspects, the method 1000 is used by one of two communicating devices to jointly determine communication parameters appropriate for the quality of the link between the two devices. This may provide for increased transmission speeds and therefore more efficient utilization of a wireless medium bandwidth in some aspects. For example, by some aspects determining an MCS based on a plurality of frames transmitted from one device to another, an MCS used to exchange probe requests and responses between the two devices may be increased relate to a MCS that may be used in known methods. As probe traffic can comprise a significant percentage of wireless traffic on some networks, increasing the MCS used to transmit probe messages may improve utilization of the wireless medium when compared to known methods.

First, at block 1010, the wireless device receives one or more frames from an access point. Each frame may be decoded to determine a transmission power indication. For example, the wireless device 106 can receive the frames 810 from the access point 104.

Next, at block 1020, the wireless device estimates a link quality based on the one or more received transmission power indication(s). For example, the wireless device 106 can estimate a link quality to the access point 104 based on one or more of the transmission power indication, a received power measurement, and/or receive capability information for the access point 104, etc.

Then, at block 1030, the wireless device transmits a probe request using or based on a first set of communication parameters based on the estimated link quality. In some aspects, the first set of communication parameters is determined such that they are compatible with the estimated link quality. For example, in some aspects, the wireless device may maintain a mapping between one or more estimated link qualities and communication parameters compatible with each link quality. Generally, the higher the quality of the link, the higher coding rate that may be used, while still maintaining a low packet error and/or loss rate.

In some aspects, the wireless device 106 may transmit the probe request 820 to the access point 104. The probe request 820 can be transmitted using the first set of communication parameters, such as a set defining a minimum coding rate. In some aspects, the minimum coding rate may be one of a plurality of rates determined to be compatible with the estimated link quality.

Thereafter, at block 1040, the wireless device receives a probe response using or based on a second set of communication parameters. The second set of communication parameters is a function of the first set of communication parameters, as described above. For example, the wireless device 106 can receive the probe response 830 from the access point 104.

In an embodiment, the method shown in FIG. 8 can be implemented in a wireless device that can include a receiving circuit, an estimating circuit, and a transmitting circuit. Those skilled in the art will appreciate that a wireless device can have more components than the simplified wireless device described herein. The wireless device described herein includes only those components useful for describing some prominent features of implementations within the scope of the claims.

The receiving circuit can be configured to receive the one or more frames and/or the probe response. In some embodiments, the receiving circuit can be configured to perform at least blocks 1010 and/or 1040 of FIG. 8. The receiving circuit can include one or more of the processor 404 (FIG. 2), the receiver 412 (FIG. 2), the antenna 416 (FIG. 2), and the transceiver 414 (FIG. 2). In some implementations, means for receiving can include the receiving circuit.

The estimating circuit can be configured to estimate the link quality. In some embodiments, the estimating circuit can be configured to perform at least block 1020 of FIG. 8. The estimating circuit can include one or more of the processor 404 (FIG. 2), the DSP 420, the signal detector 418 (FIG. 2), the receiver 412 (FIG. 2), and the memory 406 (FIG. 2). In some implementations, means for estimating can include the estimating circuit.

The transmitting circuit can be configured to transmit the probe request. In some embodiments, the transmitting circuit can be configured to perform at least block 1020 of FIG. 8. The transmitting circuit can include one or more of the processor 404 (FIG. 2), the transmitter 410 (FIG. 2), the antenna 416 (FIG. 2), and the transceiver 414 (FIG. 2). In some implementations, means for transmitting can include the transmitting circuit.

Beacon Size Reduction

As discussed above, in various embodiments, a large amount of channel time can be consumed by beacons and probe responses. This can be particularly true in dense networks. In one embodiment, channel time can be reduced by omitting neighbor information in frames such as beacons and probe responses unless requested by a station. The neighbor information may include information gathered by a first access point pertaining to one or more characteristics of other access points within a proximity of the first access point. For example, for each access point identified within neighbor information, one or more of the following may be included: MAC address, security parameters associated with the access point, channel number, regulatory class, phy options, TBTT Offset, beacon interval parameters, reachability (not reachable, unknown, reachable).

Reduced channel time can increase overall network efficiency. In some embodiments, the access point can conditionally include neighbor report information in a probe response, based on an indication in a probe request.

Figure 9:
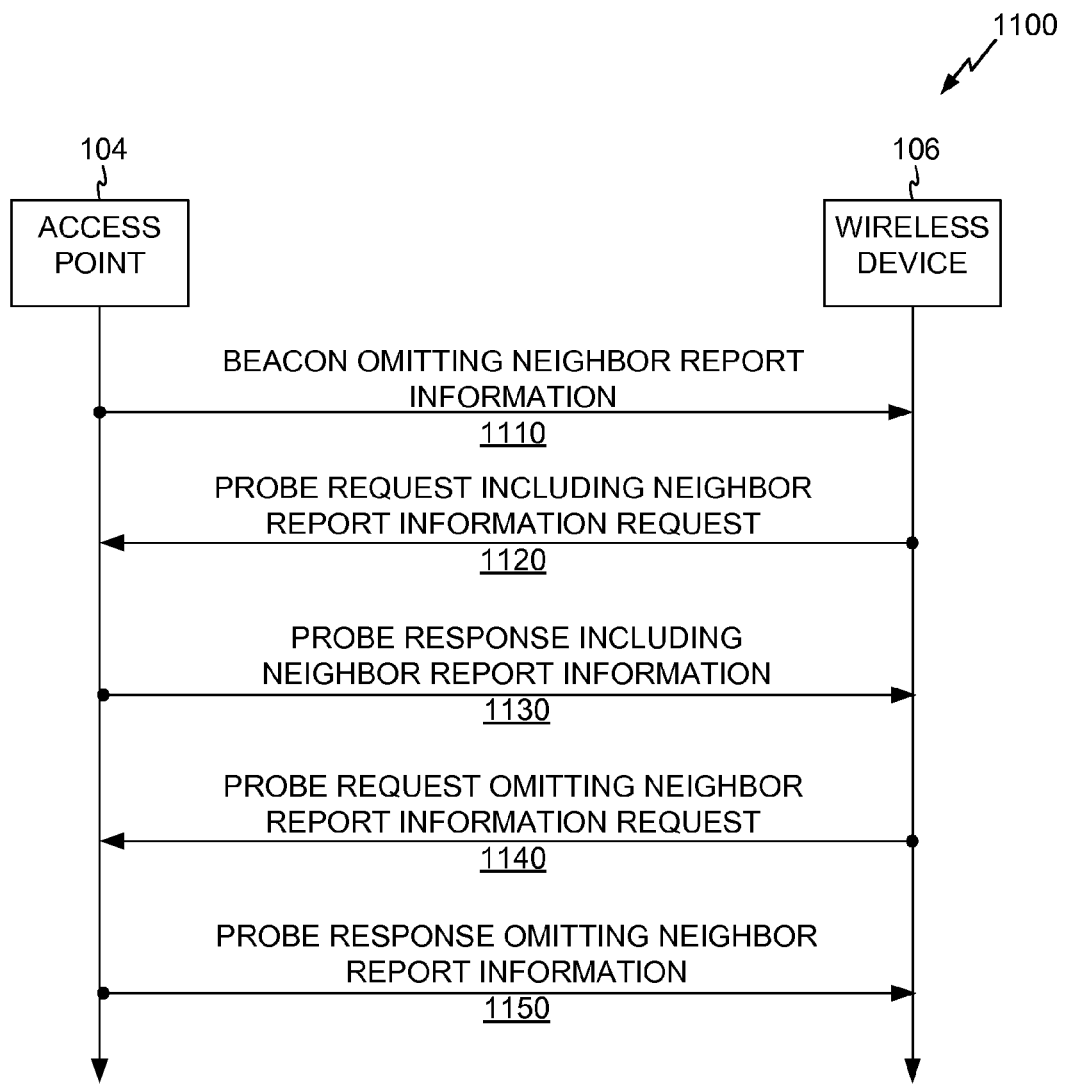
FIG. 9 shows an embodiment of the wireless communication system in which aspects of the present disclosure may be employed.

FIG. 9 shows an embodiment of the wireless communication system 1100 in which aspects of the present disclosure may be employed. As shown, the wireless communication system 1100 includes the access point 104 and a wireless device 106. The wireless communication system 1100 can be similar to the wireless communication system 100, described above with respect to FIG. 1. For example, the access point 104 can include the access point 104 shown in FIG. 1, and the wireless device 106 can include any of the wireless devices 106a-106d shown in FIG. 1. In various embodiments, the access point 104 and/or the wireless device 106 can include the wireless device 402 (FIG. 2) or any other suitable device.

FIG. 9 illustrates an exemplary communication exchange between the access point 104 and the wireless device 106. In the illustrated communication exchange, the access point 104 can be configured to conditionally include neighbor report information in a probe response. Although the illustrated communications are shown and described herein with reference to a particular order, in various embodiments, communication herein can be performed in a different order, or omitted, and additional communications can be added.

First, the wireless device 106 receives a beacon 1110. The beacon 1110 omits neighbor report information (which could otherwise be included in a conventional beacon). Because the wireless device 106 has not yet received the neighbor report information, the wireless device 106 can generate a probe request 1120 including a request for neighbor report information.

Then, the wireless device 106 transmits the probe request 1120 to the access point 104. In some embodiments, probe request 1120 can include an information element (IE) indicating a request for neighbor report information. In an embodiment, the IE can be referred to as a "Neighbor Report Info Request."

Thereafter, the access point 104 transmits a probe response 1130 to the wireless device 106. The probe response 1130 includes the requested neighbor report information. The wireless device 106 can store the neighbor report information, for example in the memory 406 (FIG. 2).

In embodiments where the wireless device 106 has previously stored the neighbor report information, it can send a probe request 1140 omitting the neighbor report information request. Thus, the access point 104 can respond with a probe response 1150 omitting the neighbor report information.

Figure 10:
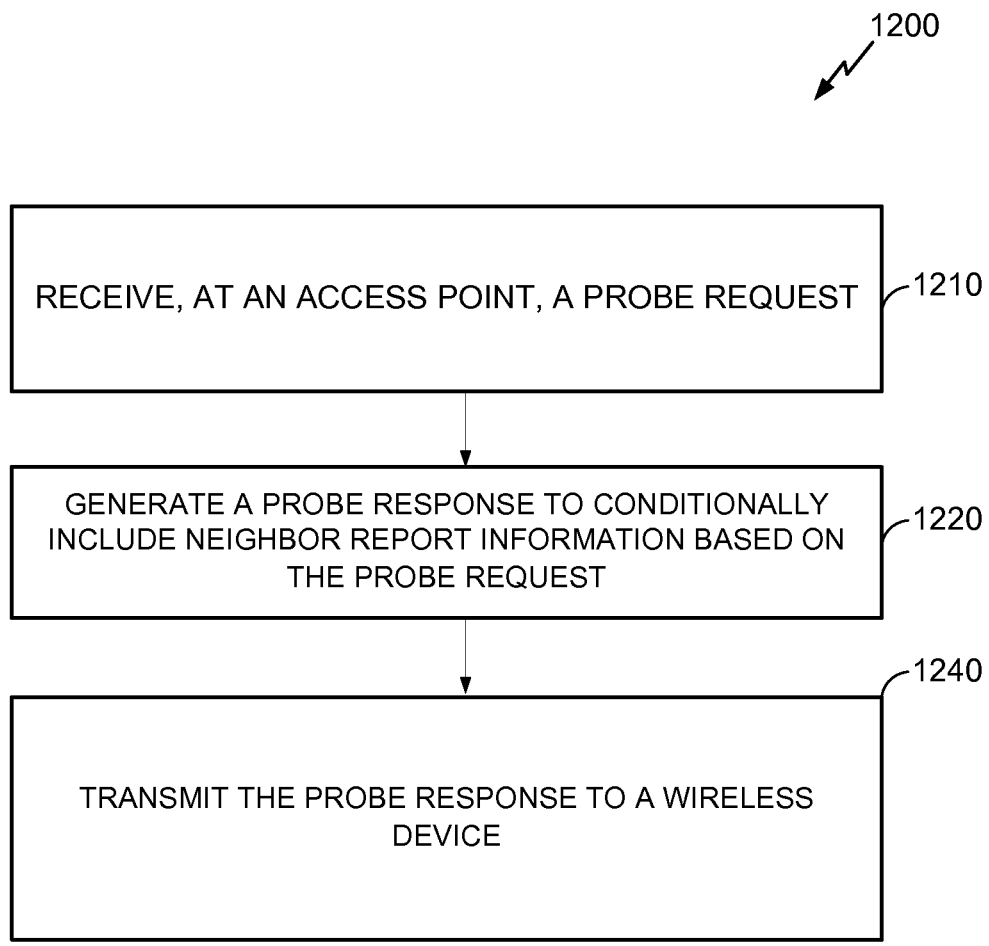
FIG. 10 shows a flowchart for an exemplary method of wireless communication that can be employed within the wireless communication system of FIG. 9.

FIG. 10 shows a flowchart 1200 for an exemplary method of wireless communication that can be employed within the wireless communication system 1100 of FIG. 9. The method can be implemented in whole or in part by the devices described herein, such as the wireless device 402 shown in FIG. 2. Although the illustrated method is described herein with reference to the wireless communication system 120 discussed above with respect to FIG. 1, the wireless communication systems 1100 discussed above with respect to FIG. 9, and the wireless device 402 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

Method 1200 may be utilized by two devices communicating on a wireless network to reduce the amount of data transmitted between them. For example, known methods may transmit beacon frames that include neighbor report information. As beacon transmissions occur frequently, some portion of a wireless medium capacity may be consumed by the transmission of neighbor report information. Many devices receiving the neighbor report information may already have received it from previous beacon frames. Therefore, inclusion of the neighbor report information is beacon frames may consume capacity of a wireless medium that may be better used for other purposes. Method 1200 provides a method to include neighbor report information in a probe response message, and include the information in some aspects only when a device explicitly requests the information. This may reduce the total number of transmissions of neighbor report information on a wireless network, thus freeing capacity of the wireless network for other uses.

First, at block 1210, the access point can receive a probe request. For example, the access point 104 can receive the probe request 1120 from the wireless device 106. The probe request 1120 can include an indication requesting neighbor report information. In some embodiments, the indication can explicitly request to send or not to send the neighbor report information. In other embodiments, the absence of an explicit request can be interpreted as a request to send or not to send the neighbor report information. The access point may decode the probe request to determine whether neighbor report information is requested.

Then, at block 1220, the access point generates a probe response in response to and based on the probe request. The access point may conditionally include neighbor report information in the probe response based decoding whether an indication or absence of an indication is in the probe request. For example, the access point 104 can determine whether or not the probe request 1120 includes an indication that neighbor report information should be sent, and can include or omit the neighbor report information accordingly.

Thereafter, at block 1240, the access point transmits the probe response to a wireless device. For example, the access point 104 can transmit the probe response 1130 including neighbor report information to the wireless device 106 if it was requested by the probe request. In embodiments where the wireless device 106 already has neighbor report information and transmits the probe request 1140 omitting the neighbor report information request, the access point 104 can transmit the probe response 1150 omitting the neighbor report information.

Some aspects of process 1200 include transmitting a beacon having no neighbor report information. For example, since neighbor report information is being provided b a device performing process 1200 via the probe response message described above when requested, there may be no need to include the neighbor report information in the beacon. This reduces the size of the beacon, thus saving capacity of the wireless medium for other purposes.

In an embodiment, the method shown in FIG. 10 can be implemented in a wireless device that can include a receiving circuit, a generating circuit, and a transmitting circuit. Those skilled in the art will appreciate that a wireless device can have more components than the simplified wireless device described herein. The wireless device described herein includes only those components useful for describing some prominent features of implementations within the scope of the claims.

The receiving circuit can be configured to receive the probe request. In some embodiments, the receiving circuit can be configured to perform at least block 1210 of FIG. 10. The receiving circuit can include one or more of the processor 404 (FIG. 2), the receiver 412 (FIG. 2), the antenna 416 (FIG. 2), and the transceiver 414 (FIG. 2). In some implementations, means for receiving can include the receiving circuit.

The generating circuit can be configured to generate the probe response. In some embodiments, the generating circuit can be configured to perform at least block 1220 of FIG. 10. The generating circuit can include one or more of the processor 404 (FIG. 2), the DSP 420, the signal detector 418 (FIG. 2), and the memory 406 (FIG. 2). In some implementations, means for generating can include the generating circuit.

The transmitting circuit can be configured to transmit the probe responses. In some embodiments, the transmitting circuit can be configured to perform at least block 1240 of FIG. 10. The transmitting circuit can include one or more of the processor 404 (FIG. 2), the transmitter 410 (FIG. 2), the antenna 416 (FIG. 2), and the transceiver 414 (FIG. 2). In some implementations, means for transmitting can include the transmitting circuit.

Figure 11:
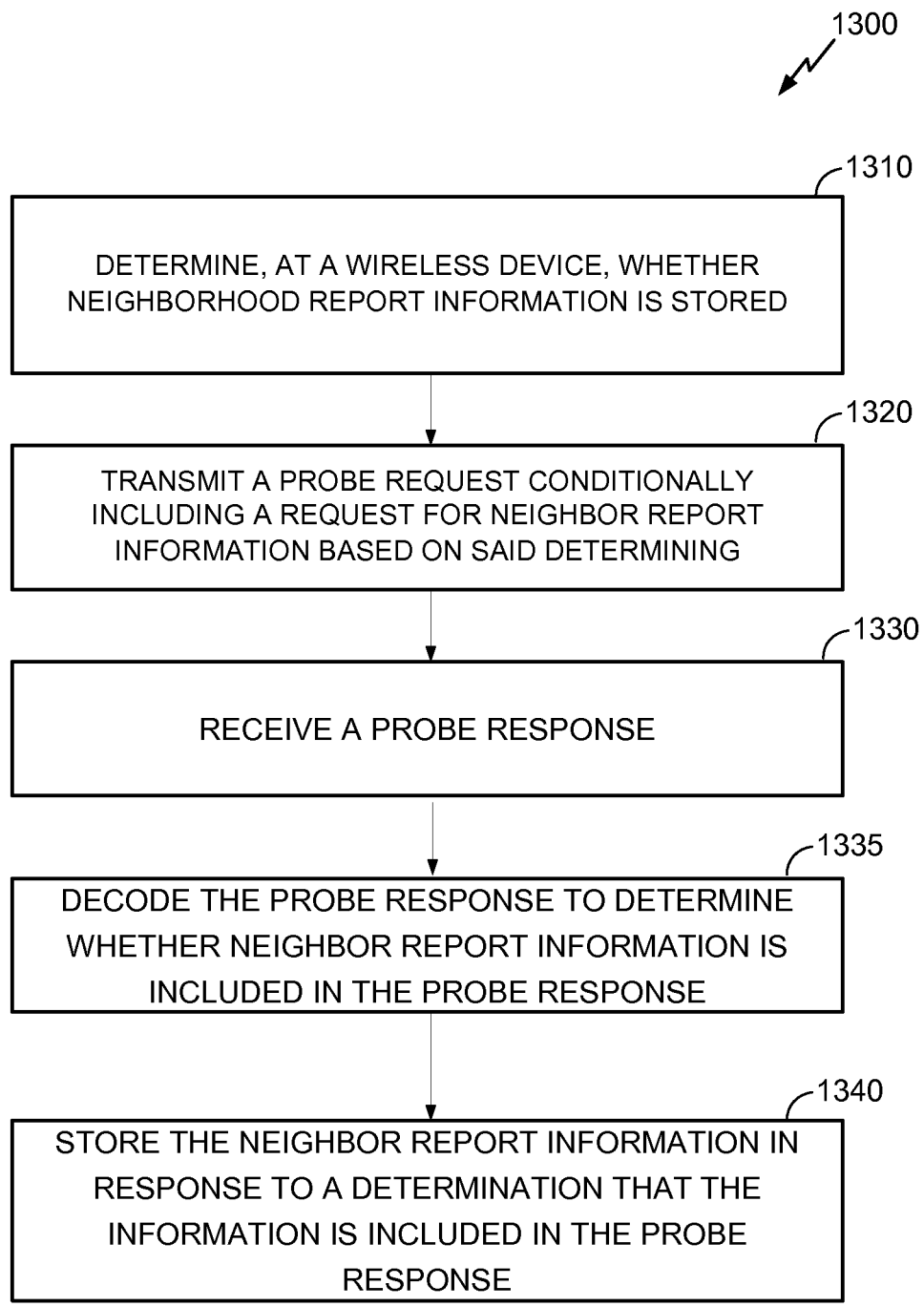
FIG. 11 shows a flowchart for an exemplary method of wireless communication that can be employed within the wireless communication system of FIG. 9.

FIG. 11 shows a flowchart 1300 for an exemplary method of wireless communication that can be employed within the wireless communication system 1100 of FIG. 9. The method can be implemented in whole or in part by the devices described herein, such as the wireless device 402 shown in FIG. 2. Although the illustrated method is described herein with reference to the wireless communication system 130 discussed above with respect to FIG. 1, the wireless communication systems 1100 discussed above with respect to FIG. 9, and the wireless device 402 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

Method 1300 may be utilized by two devices communicating on a wireless network to reduce the amount of data transmitted between them. For example, known methods may transmit beacon frames that include neighbor report information. As beacon transmissions occur frequently, some portion of a wireless medium capacity may be consumed by the transmission of neighbor report information included in beacon frames, where the neighbor report information included in the beacon frames is essentially not utilized by many devices receiving the information. For example, many devices receiving the neighbor report information may already have received it from previous beacon frames. Therefore, inclusion of the neighbor report information is beacon frames may consume capacity of a wireless medium that may be better used for other purposes. Method 1300 provides a method to decode neighbor report information from a probe response message, and request the information when needed. This may reduce the total number of transmissions of neighbor report information on a wireless network, thus freeing capacity of the wireless network for other uses.

First, at block 1310, the wireless device determines whether neighborhood report information is stored. For example, the wireless device 106 can determine whether the memory 406 stores neighborhood report information for the network of the access point 104. In some embodiments, the wireless device 106 can only consider recent neighborhood report information, for example that which has been received within a threshold amount of time.

Next, at block 1320, the wireless device transmits a probe request conditionally including a request for neighbor report information based on said determining. For example, if the wireless device 106 determines that neighbor report information is needed, it can transmit the probe request 1120 including a request for neighbor report information. If the wireless device 106 determines that neighbor report information is not needed, it can transmit the probe request 1140 omitting the request for neighbor report information.

Then, at block 1330, the wireless device receives a probe response. The probe response may include the neighbor report information when the probe request includes the request for neighbor report information. For example, the wireless device 106 can receive the probe response 1130 including the neighbor report information in response to the probe request 1120. The wireless device 106 can receive the probe response 1150 omitting the neighbor report information in response to the probe request 1140.

In block 1335, the probe response is decoded to determine whether neighbor report information is included in the probe response. If the information is included, it may be stored in block 1340.

In an embodiment, the method shown in FIG. 11 can be implemented in a wireless device that can include a determining circuit, a transmitting circuit, a receiving circuit, a decoding circuit, and a storing circuit. Those skilled in the art will appreciate that a wireless device can have more components than the simplified wireless device described herein. The wireless device described herein includes only those components useful for describing some prominent features of implementations within the scope of the claims.

The determining circuit can be configured to determine whether neighborhood report information is stored. In some embodiments, the determining circuit can be configured to perform at least block 1310 of FIG. 11. The determining circuit can include one or more of the processor 404 (FIG. 2), the DSP 420, the signal detector 418 (FIG. 2), the receiver 412 (FIG. 2), and the memory 406 (FIG. 2). In some implementations, means for determining can include the determining circuit.

The transmitting circuit can be configured to transmit the probe request. In some embodiments, the transmitting circuit can be configured to perform at least block 1320 of FIG. 11. The transmitting circuit can include one or more of the processor 404 (FIG. 2), the transmitter 410 (FIG. 2), the antenna 416 (FIG. 2), and the transceiver 414 (FIG. 2). In some implementations, means for transmitting can include the transmitting circuit.

The receiving circuit can be configured to receive the probe response. In some embodiments, the receiving circuit can be configured to perform at least block 1320 of FIG. 11. The receiving circuit can include one or more of the processor 404 (FIG. 2), the receiver 412 (FIG. 2), the antenna 416 (FIG. 2), and the transceiver 414 (FIG. 2). In some implementations, means for receiving can include the receiving circuit.

The decoding circuit can be configured to decode the probe response to determine whether neighbor report information is included in the probe response. In some embodiments, the decoding circuit can be configured to perform at least block 1335 of FIG. 11. The decoding circuit can include one or more of the processor 404 (FIG. 2), the DSP 420, the signal detector 418 (FIG. 2), the receiver 412 (FIG. 2), and the memory 406 (FIG. 2). In some implementations, means for decoding can include the determining circuit.

The storing circuit can be configured to store the neighbor report information if it is included in the probe response. In some embodiments, the storing circuit can be configured to perform at least block 1340 of FIG. 11. The storing circuit can include one or more of the processor 404 (FIG. 2), the DSP 420, the signal detector 418 (FIG. 2), the receiver 412 (FIG. 2), and the memory 406 (FIG. 2). In some implementations, means for storing can include the storing circuit.

Shared Wireless Device State Information

As discussed above, in various embodiments, a large amount of channel time can be consumed by beacons and probe responses. This can be particularly true in dense networks. In one embodiment, channel time can be reduced by omitting at least some data shared between probe requests and association requests. Reduced channel time can increase overall network efficiency. In some embodiments, the access point can store the shared data and can indicate a timeout period during which the shared data will be maintained.

Figure 12:
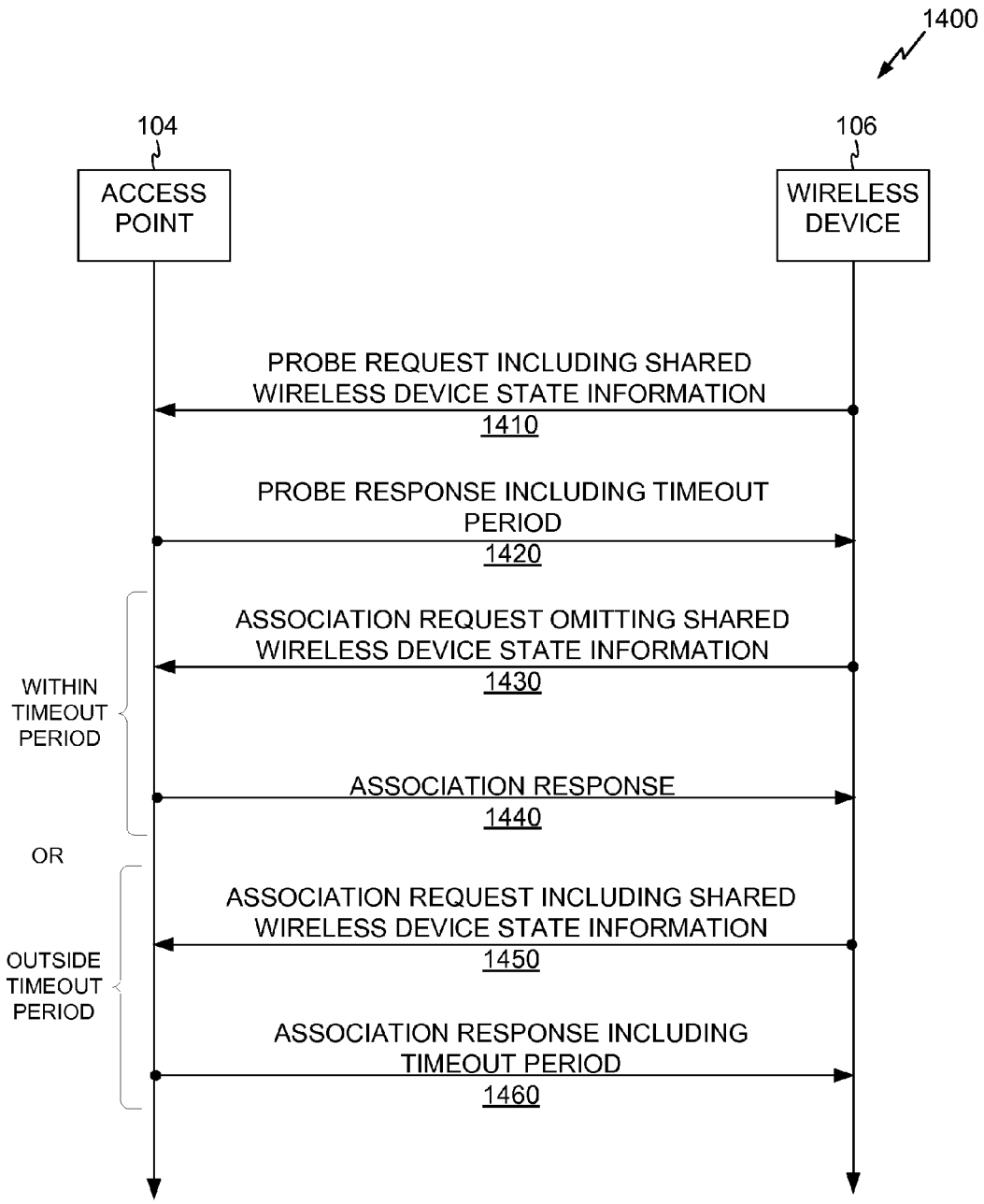
FIG. 12 shows an embodiment of the wireless communication system in which aspects of the present disclosure may be employed.

FIG. 12 shows an embodiment of the wireless communication system 1400 in which aspects of the present disclosure may be employed. As shown, the wireless communication system 1400 includes the access point 104 and a wireless device 106. The wireless communication system 1400 can be similar to the wireless communication system 100, described above with respect to FIG. 1. For example, the access point 104 can include the access point 104 shown in FIG. 1, and the wireless device 106 can include any of the wireless devices 106a-106d shown in FIG. 1. In various embodiments, the access point 104 and/or the wireless device 106 can include the wireless device 402 (FIG. 2) or any other suitable device.

FIG. 12 illustrates an exemplary communication exchange between the access point 104 and the wireless device 106. In the illustrated communication exchange, the access point 104 can be configured to store shared data and indicate a timeout period. Although the illustrated communications are shown and described herein with reference to a particular order, in various embodiments, communication herein can be performed in a different order, or omitted, and additional communications can be added.

First, the wireless device 106 transmits a probe request 1410 including shared wireless device state information. In some embodiments, shared wireless device information can include indications of one or more of: shared rates, extended supported rates, supported operating classes, high-throughput (HT) capabilities, 20/40 basic service set (BSS) coexistence, and extended capabilities. The probe request can further include indications of one or more of: a service set identification (SSID), an information request, a direct-sequence spread spectrum (DSSS) parameter set, an SSID list, a channel usage, an interworking indication, and a mesh identification. The access point 104 can store the shared wireless device state information, for example in the memory 406 (FIG. 2).

Upon reception of the probe request, the access point 104 may respond with an ACK including an indication that the information was stored. Then, the access point 104 transmits a probe response 1420 including a timeout period. The timeout period can indicate how long the access point 104 will store the shared wireless device information. When the access point 104 receives frames from the wireless device 106 within the timeout period, the access point 104 can associate the received frame with the shared wireless device information. Thus, the shared wireless device information can be omitted from the frame. After the timeout period, however, the access point 104 can discard the shared wireless device information.

For example, the wireless device 106 can transmit an association request 1430 within the timeout period. Thus, the association request 1430 can omit some or all of the shared wireless device information. In some embodiments, the association request 1430 can include indications of one or more of a capability, a listen interval, a service set identification (SSID), supported channels, a robust security network (RSN) indication, a quality-of-service (QoS) capability, RM enabled capabilities, a mobility domain, and a QoS traffic capability. The access point 104 can read the shared wireless device information from memory 406 (FIG. 2) and can respond with an association response 1440.

On the other hand, the wireless device 106 can transmit an association request 1450 outside the timeout period. Thus, the association request 1430 can include some or all of the shared wireless device information. The access point 104 can read the shared wireless device information from the association request 1450 and can respond with an association response 1460.

Figure 13:
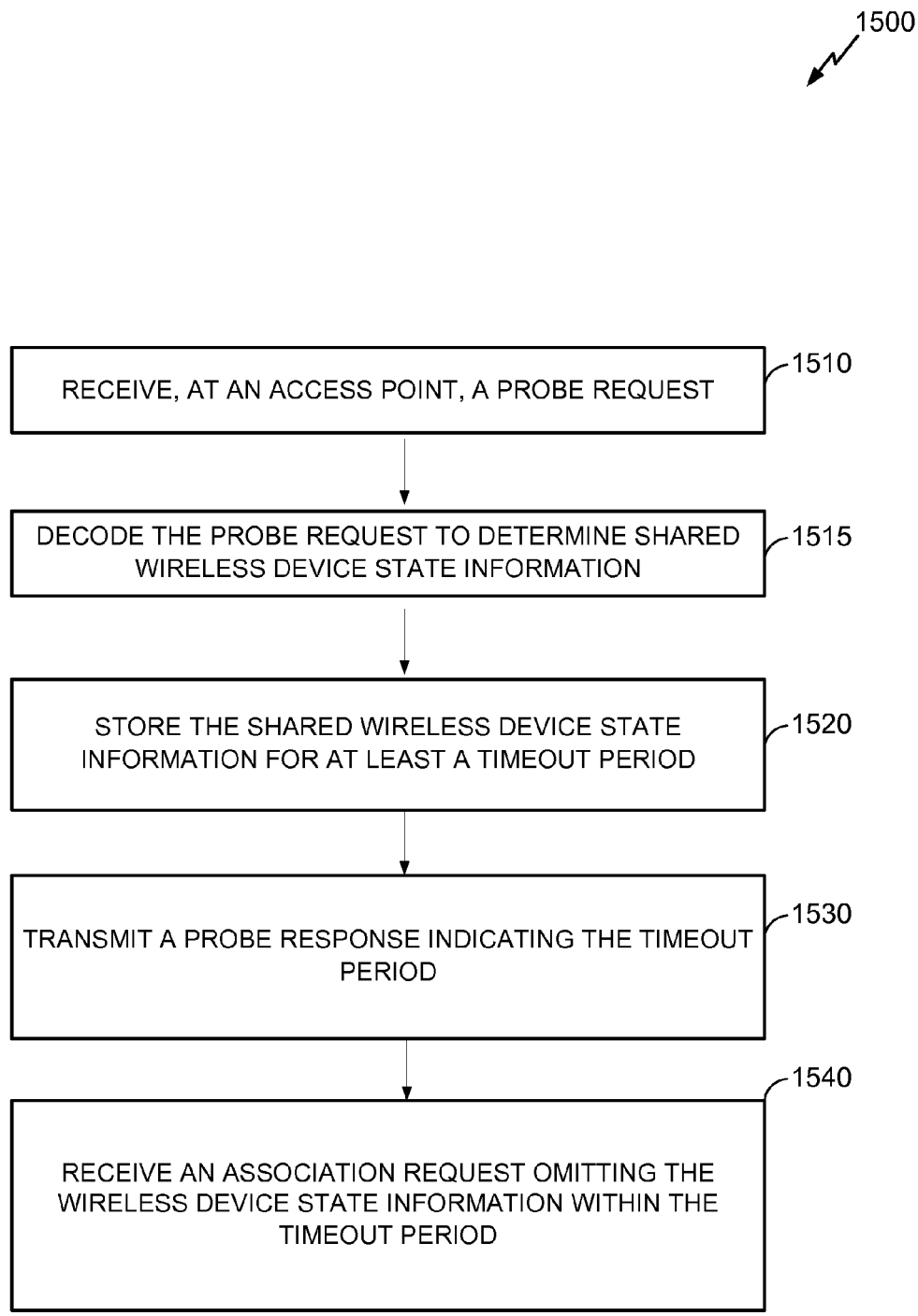
FIG. 13 shows a flowchart for an exemplary method of wireless communication that can be employed within the wireless communication system of FIG. 12.

FIG. 13 shows a flowchart 1500 for an exemplary method of wireless communication that can be employed within the wireless communication system 1400 of FIG. 12. The method can be implemented in whole or in part by the devices described herein, such as the wireless device 402 shown in FIG. 2. Although the illustrated method is described herein with reference to the wireless communication system 150 discussed above with respect to FIG. 1, the wireless communication systems 1400 discussed above with respect to FIG. 12, and the wireless device 402 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1510, the access point receives a probe request For example, the access point 104 can receive the probe request 1410 that includes shared wireless device state information from the wireless device 106.

At block 1515, the access point decodes the probe request to determine the shared wireless device state information. For example, the access point may be configured to parse the probe request to determine a location of the shared wireless state information within the probe request. In some aspects, the access point decodes the shared wireless state information to determine one or more of: shared rates, extended supported rates, supported operating classes, high-throughput (HT) capabilities, 20/40 basic service set (BSS) coexistence, and extended capabilities. In some aspects, the access point decodes the probe request to determine one or more of: a service set identification (SSID), an information request, a direct-sequence spread spectrum (DSSS) parameter set, an SSID list, a channel usage, an interworking indication, and a mesh identification.

Then, at block 1520, the access point can store the shared wireless device state information for at least a timeout period. For example, the access point 104 can store the shared wireless device state information in the memory 406. After the timeout period expires, the access point 104 can expire, erase, or otherwise discard the shared wireless device state information.

Next, at block 1530, the access point transmits a probe response indicating the timeout period. For example, the access point 104 can transmit the probe response 1420 to the wireless device 106. The probe response 1420 can include the timeout period, for example, as an information element.

Thereafter, at block 1540, the access point receives an association request omitting the wireless device state information within the timeout period. For example, the access point 104 can receive the association request 1430 from the wireless device 106. The access point 104 can retrieve the shared wireless device state information from the memory 406 and can respond with the association response 1440. In some aspects, the access point may decode the association request to determine one or more of: a capability, a listen interval, a service set identification (SSID), supported channels, a robust security network (RSN) indication, a quality-of-service (QoS) capability, RM enabled capabilities, a mobility domain, and a QoS traffic capability.

In other embodiments, as discussed above, the access point 104 can receive a second association request 1450 outside the timeout period. In some aspects, the second association request received outside the timeout period may include the shared state information. In these aspects, association requests received outside the timeout period can be decoded to determine updated shared state information. An association response may then be generated based on the updated shared state information received in the second association request. In some aspects, this is shown by association response 1460 in FIG. 12.

In an embodiment, the method shown in FIG. 13 can be implemented in a wireless device that can include a receiving circuit, a decoding circuit, a storing circuit, and a transmitting circuit. Those skilled in the art will appreciate that a wireless device can have more components than the simplified wireless device described herein. The wireless device described herein includes only those components useful for describing some prominent features of implementations within the scope of the claims.

The receiving circuit can be configured to receive the probe request and/or association request. In some embodiments, the receiving circuit can be configured to perform at least blocks 1510, and/or 1540 of FIG. 13. The receiving circuit can include one or more of the processor 404 (FIG. 2), the receiver 412 (FIG. 2), the antenna 416 (FIG. 2), and the transceiver 414 (FIG. 2). In some implementations, means for receiving can include the receiving circuit.

The decoding circuit can be configured to decode the probe request to determine the shared wireless device state information. In some embodiments, the decoding circuit can be configured to perform at least block 1515 of FIG. 13. The decoding circuit can include one or more of the processor 404 (FIG. 2), receiver 412 (FIG. 2), the antenna 416 (FIG. 2), and/or the transceiver 414 (FIG. 2). In some implementations, means for decoding can include the decoding circuit.

The storing circuit can be configured to store the shared wireless device state information. In some embodiments, the storing circuit can be configured to perform at least block 1520 of FIG. 13. The storing circuit can include one or more of the processor 404 (FIG. 2), the DSP 420, and the memory 406 (FIG. 2). In some implementations, means for storing can include the storing circuit.

The transmitting circuit can be configured to transmit the probe responses. In some embodiments, the transmitting circuit can be configured to perform at least block 1530 of FIG. 13. The transmitting circuit can include one or more of the processor 404 (FIG. 2), the transmitter 410 (FIG. 2), the antenna 416 (FIG. 2), and the transceiver 414 (FIG. 2). In some implementations, means for transmitting can include the transmitting circuit.

Figure 14:
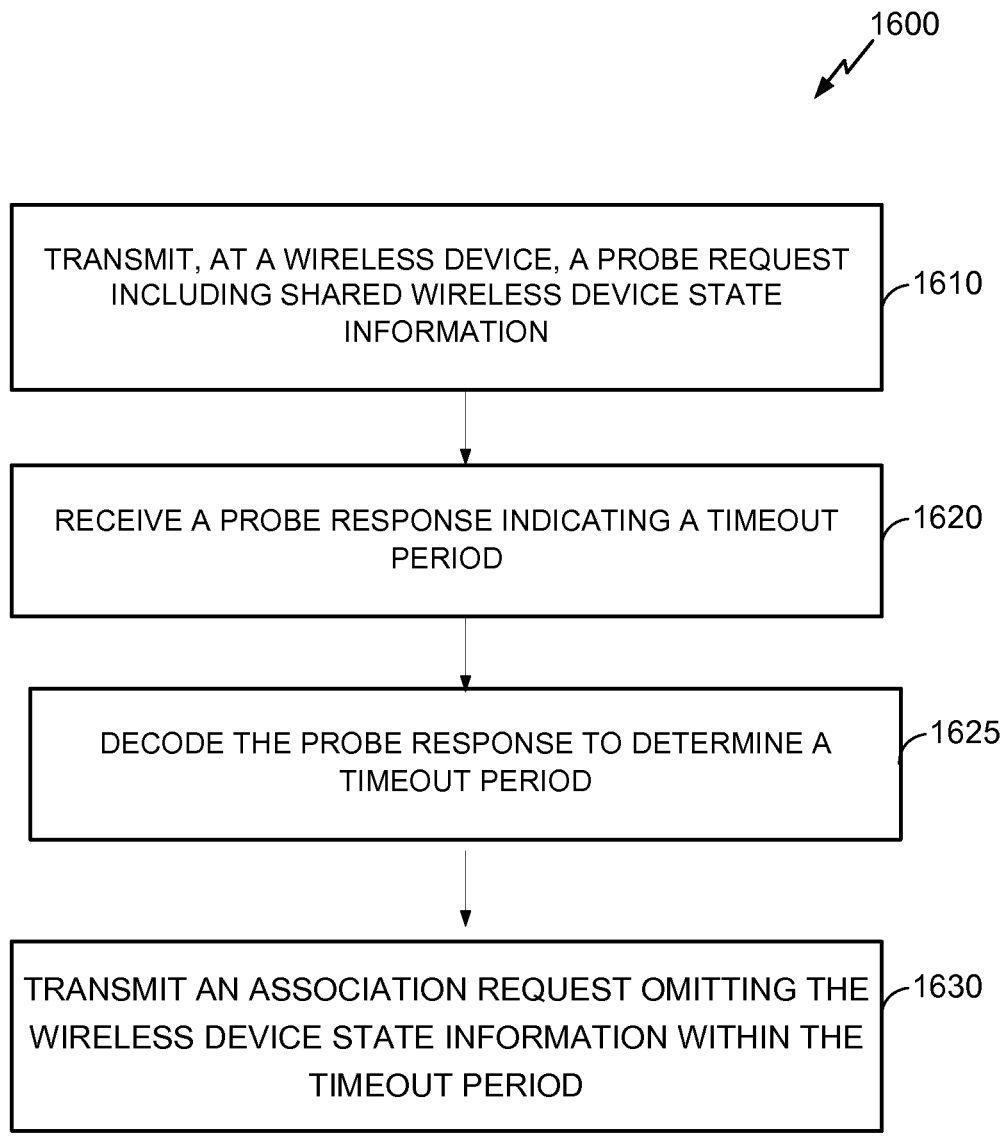
FIG. 14 shows a flowchart for an exemplary method of wireless communication that can be employed within the wireless communication system of FIG. 12.

FIG. 14 shows a flowchart 1600 for an exemplary method of wireless communication that can be employed within the wireless communication system 1400 of FIG. 12. The method can be implemented in whole or in part by the devices described herein, such as the wireless device 402 shown in FIG. 2. Although the illustrated method is described herein with reference to the wireless communication system 160 discussed above with respect to FIG. 1, the wireless communication systems 1400 discussed above with respect to FIG.

12, and the wireless device 402 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1610, the wireless device transmits a probe request including shared wireless device state information. For example, the wireless device 106 can transmit the probe request 1410 to the access point 104. The shared wireless device state information can include information shared between one or more wireless communication frames, such as conventional probe requests and association requests. In some aspects, the shared wireless state information is generated to include indications of one or more of: shared rates, extended supported rates, supported operating classes, high-throughput (HT) capabilities, 20/40 basic service set (BSS) coexistence, and extended capabilities. By omitting the shared wireless device state information from at least one frame, network traffic can be reduced. In some aspects, the probe request to generated to include indications of one or more of: a service set identification (SSID), an information request, a direct-sequence spread spectrum (DSSS) parameter set, an SSID list, a channel usage, an interworking indication, and a mesh identification. By omitting the shared wireless device state information from at least one frame, network traffic can be reduced.

Then, at block 1620, the wireless device receives a probe response. In block 1625, the probe response is decoded to determine a timeout period. For example, the wireless device 106 can receive the probe response 1420 from the access point 104. The timeout period can indicate how long the access point 104 will store the shared wireless device state information.

Next, at block 1630, the wireless device transmits an association request omitting the wireless device state information within the timeout period. For example, the wireless device 106 can transmit the association request 1430 and can receive the association response 1440. In some aspects, the association request is generated to include indications of one or more of: a capability, a listen interval, a service set identification (SSID), supported channels, a robust security network (RSN) indication, a quality-of-service (QoS) capability, RM enabled capabilities, a mobility domain, and a QoS traffic capability. As discussed above, in other embodiments, the wireless device 106 can transmit a second association request (such as association request 1450) outside the timeout period. Thus, the second association request 1450 can include the shared wireless device state information in response to the second association request being transmitted outside the timeout period.

In an embodiment, the method shown in FIG. 14 can be implemented in a wireless device that can include a decoding circuit, transmitting circuit and a receiving circuit. Those skilled in the art will appreciate that a wireless device can have more components than the simplified wireless device described herein. The wireless device described herein includes only those components useful for describing some prominent features of implementations within the scope of the claims.

The transmitting circuit can be configured to transmit the probe request and/or association request. In some embodiments, the transmitting circuit can be configured to perform at least blocks 1610 and/or 1630 of FIG. 14. The transmitting circuit can include one or more of the processor 404 (FIG. 2), the transmitter 410 (FIG. 2), the antenna 416 (FIG. 2), and the transceiver 414 (FIG. 2). In some implementations, means for transmitting can include the transmitting circuit.

The receiving circuit can be configured to receive the probe response. In some embodiments, the receiving circuit can be configured to perform at least block 1620 of FIG. 14. The receiving circuit can include one or more of the processor 404 (FIG. 2), receiver 412 (FIG. 2), the antenna 416 (FIG. 2), and the transceiver 414 (FIG. 2). In some implementations, means for receiving can include the receiving circuit.

The decoding circuit can be configured to decode the probe response. In some embodiments, the decoding circuit can be configured to perform at least block 1625 of FIG. 14. The decoding circuit can include one or more of the processor 404 (FIG. 2), receiver 412 (FIG. 2), the antenna 416 (FIG. 2), and the transceiver 414 (FIG. 2). In some implementations, means for decoding can include the decoding circuit.

Shared Access Point State Information

As discussed above, in various embodiments, a large amount of channel time can be consumed by beacons and probe responses. This can be particularly true in dense networks. In one embodiment, channel time can be reduced by omitting at least some data shared between probe responses and association responses. Reduced channel time can increase overall network efficiency. In some embodiments, the wireless device can store the shared data and can transmit an indication that the shared data is maintained.

Figure 15:
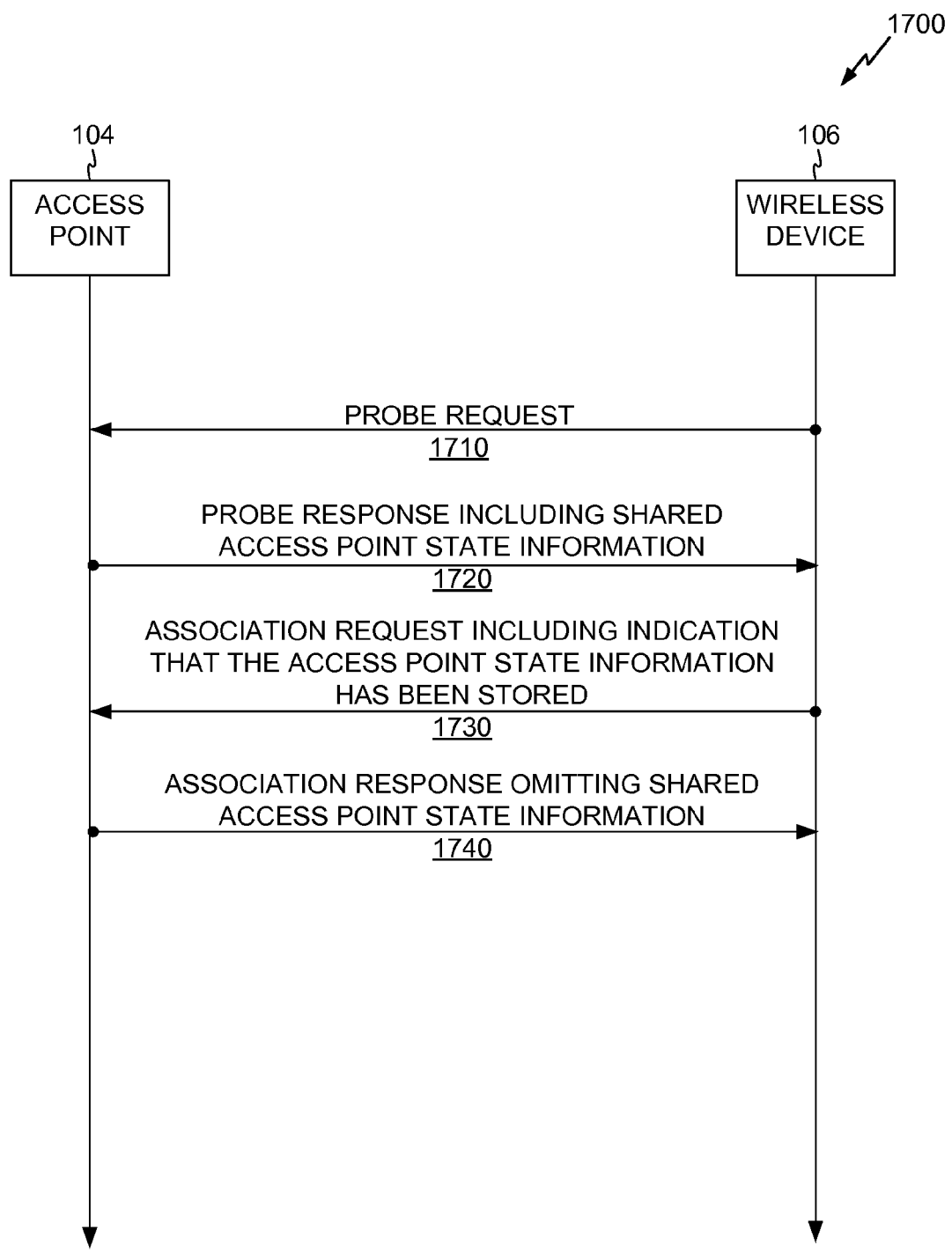
FIG. 15 shows an embodiment of the wireless communication system in which aspects of the present disclosure may be employed.

FIG. 15 shows an embodiment of the wireless communication system 1700 in which aspects of the present disclosure may be employed. As shown, the wireless communication system 1700 includes the access point 104 and a wireless device 106. The wireless communication system 1700 can be similar to the wireless communication system 100, described above with respect to FIG. 1. For example, the access point 104 can include the access point 104 shown in FIG. 1, and the wireless device 106 can include any of the wireless devices 106a-106d shown in FIG. 1. In various embodiments, the access point 104 and/or the wireless device 106 can include the wireless device 402 (FIG. 2) or any other suitable device.

FIG. 15 illustrates an exemplary communication exchange between the access point 104 and the wireless device 106. In the illustrated communication exchange, the wireless device 106 be configured to store shared access point data and can transmit an indication that the shared data is maintained. Although the illustrated communications are shown and described herein with reference to a particular order, in various embodiments, communication herein can be performed in a different order, or omitted, and additional communications can be added.

First, the wireless device 106 transmits a probe request 1710. In some embodiments, the probe request 1710 can include an indication that the wireless device 106 has stored shared access point information. The wireless device 106 can have gathered the shared access point information by earlier reception of beacon frames or probe responses sent by the access point 104. The beacon frames or probe responses can additionally include an indication of the version of the information. Such indication can, for example, include a sequence number that is incremented or otherwise modified every time the information changes.

Shared access point information can include at least some access point information common to at least two communication frames such as, for example, probe responses and association responses. In some embodiments, shared information can include indications of one or more of shared rates, extended supported rates, supported operating classes, high-throughput (HT) capabilities, 20/40 basic service set (BSS)

coexistence, and extended capabilities. The probe request can further include indications of one or more of: a service set identification (SSID), an information request, a direct-sequence spread spectrum (DSSS) parameter set, an SSID list, a channel usage, an interworking indication, and a mesh identification.

When the wireless device 106 indicates that it has stored shared access point information, the access point 104 may omit that information from one or more frames. The indication that device 106 has stored the shared information can include an indication of the version of the stored information, such as a sequence number of the information. In the illustrated embodiment, the wireless device 106 has not yet stored shared access point information.

Then, the access point 104 transmits a probe response 1720 including the shared access point information. The wireless device 106 stores the shared access point information, for example in the memory 406 (FIG. 2). In some embodiments, the wireless device 106 can expire, delete, or otherwise discard shared access point information after a timeout period. In other embodiments, the wireless device 106 can discard shared access point information after receiving an indication from the access point 104 that the shared access point information has changed.

Next, the wireless device 106 can transmit an association request 1730. The association request 1730 can indicate to the access point 104 that the wireless device 106 has stored the shared access point information. Thus, the access point 104 can respond with an association response 1740 omitting the shared access point information On the other hand, in another embodiment, the wireless device 106 can transmit an association request not indicating that shared access point information has been stored (not shown). Thus, the access point 104 can respond with an association request including some or all shared access point information (not shown).

In some aspects, the association request 1730 may indicate a version of the shared access point information that is stored by the wireless device 106. The access point 104 may then include the shared access point information in the association request if it has a newer version of the shared access point information than indicated in the association request.

Figure 16:
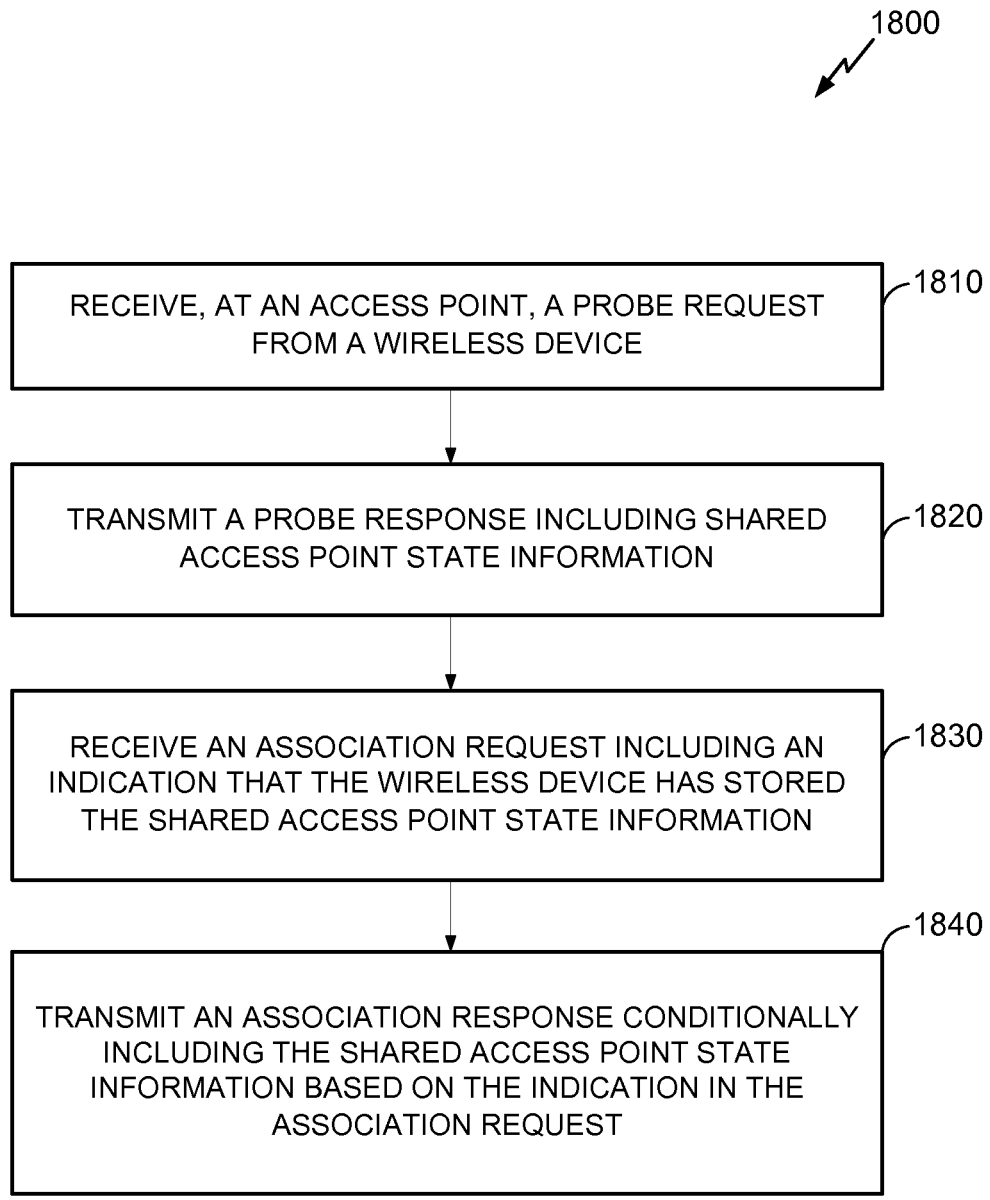
FIG. 16 shows a flowchart for an exemplary method of wireless communication that can be employed within the wireless communication system of FIG. 15.

FIG. 16 shows a flowchart 1800 for an exemplary method of wireless communication that can be employed within the wireless communication system 1700 of FIG. 15. The method can be implemented in whole or in part by the devices described herein, such as the wireless device 402 shown in FIG. 2. Although the illustrated method is described herein with reference to the wireless communication system 180 discussed above with respect to FIG. 1, the wireless communication systems 1700 discussed above with respect to FIG. 15, and the wireless device 402 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1810, the access point receives a probe request. For example, the access point 104 can receive the probe request 1710 from the wireless device 106.

Then, at block 1820, the access point transmits a probe response including shared access point information. For example, the access point 104 can transmit the probe response 1720 to the wireless device 106. The probe response 1720 can include the shared access point information. In some aspects, the probe response also includes version information for the shared access point information included in the probe response. The probe response may also be generated to include an identifier. The identifier may be associated with the shared access point information. In some aspects, the identifier is generated to include one or more of: an explicit identifier in an information element; an implicit identifier comprising a media access control (MAC) address of the access point, an implicit identifier comprising a MAC sequence number of the probe response, an implicit identifier comprising a timestamp of the probe response, an implicit identifier comprising a checksum of the probe response, and an implicit identifier comprising the last 4 bytes of the probe response.

In some aspects, the shared access point state information for the probe response is generated to include indications of one or more of: shared rates, extended supported rates, supported operating classes, high-throughput (HT) capabilities, 20/40 basic service set (BSS) coexistence, and extended capabilities.

Thereafter, at block 1830, the access point receives an association request including an indication that the wireless device has stored the shared access point information. In some aspects, the indication may indicate whether the shared access point information is stored or not. In other aspects, the indication may further indicate a version of shared access point information stored by the wireless device. For example, the access point 104 can receive the association request 1730 from the wireless device 106. Thus, the access point 104 can determine that any association response can omit at least some shared access point information.

In some aspects, the association request may be decoded to determine a version of shared access point information stored by the wireless device, and determine whether a version of shred access point information available to the access point is newer than the version stored by the device. If the access point has newer information, it may choose to include the newer information in the association response (below).

Next, in block 1840, the access point can transmit an association response conditionally including the shared access point information based on the indication in the association request. For example, in some aspects the access point includes the shared access point information in the association response if the wireless device indicated it has not stored access point state information, and does not include the shared access point information in the association response if the wireless device indicates it has stored the information. In other aspects, the indication in the association request may include version information for shared access point state information stored by the wireless device. In these aspects, the access point may compare a version of shared access point state information available to the access point against the version provided in the association request. If the version available to the access point is newer, the access point may include the shared access point information it has available in the association response, and not include it otherwise.

For example, the access point 104 can transmit the association response 1740 to the wireless device 1740. In other embodiments, as discussed above, the access point 104 can transmit an association response including at least some shared access point information when the association request does not include an indication that the shared access point information is stored.

In some aspects, the access point 104 can determine whether the version of the shared information stored by the wireless device is older than a version of shared information available to the access point. In some aspects, the access point may then generate the association response to include the newer version of the shared access point information based on the version stored by the wireless device and the version available to the access point.

In an embodiment, the method shown in FIG. 16 can be implemented in a wireless device that can include a receiving circuit and a transmitting circuit. Those skilled in the art will appreciate that a wireless device can have more components than the simplified wireless device described herein. The wireless device described herein includes only those components useful for describing some prominent features of implementations within the scope of the claims.

The receiving circuit can be configured to receive the probe request and/or association request. In some embodiments, the receiving circuit can be configured to perform at least blocks 1810 and/or 1830 of FIG. 16. The receiving circuit can include one or more of the receiver 412 (FIG. 2), the antenna 416 (FIG. 2), and the transceiver 414 (FIG. 2). In some implementations, means for receiving can include the receiving circuit.

The transmitting circuit can be configured to transmit the probe response and/or association response. In some embodiments, the transmitting circuit can be configured to perform at least blocks 1820 and/or 1840 of FIG. 16. The transmitting circuit can include one or more of the transmitter 410 (FIG. 2), the antenna 416 (FIG. 2), and the transceiver 414 (FIG. 2). In some implementations, means for transmitting can include the transmitting circuit.

Figure 17:
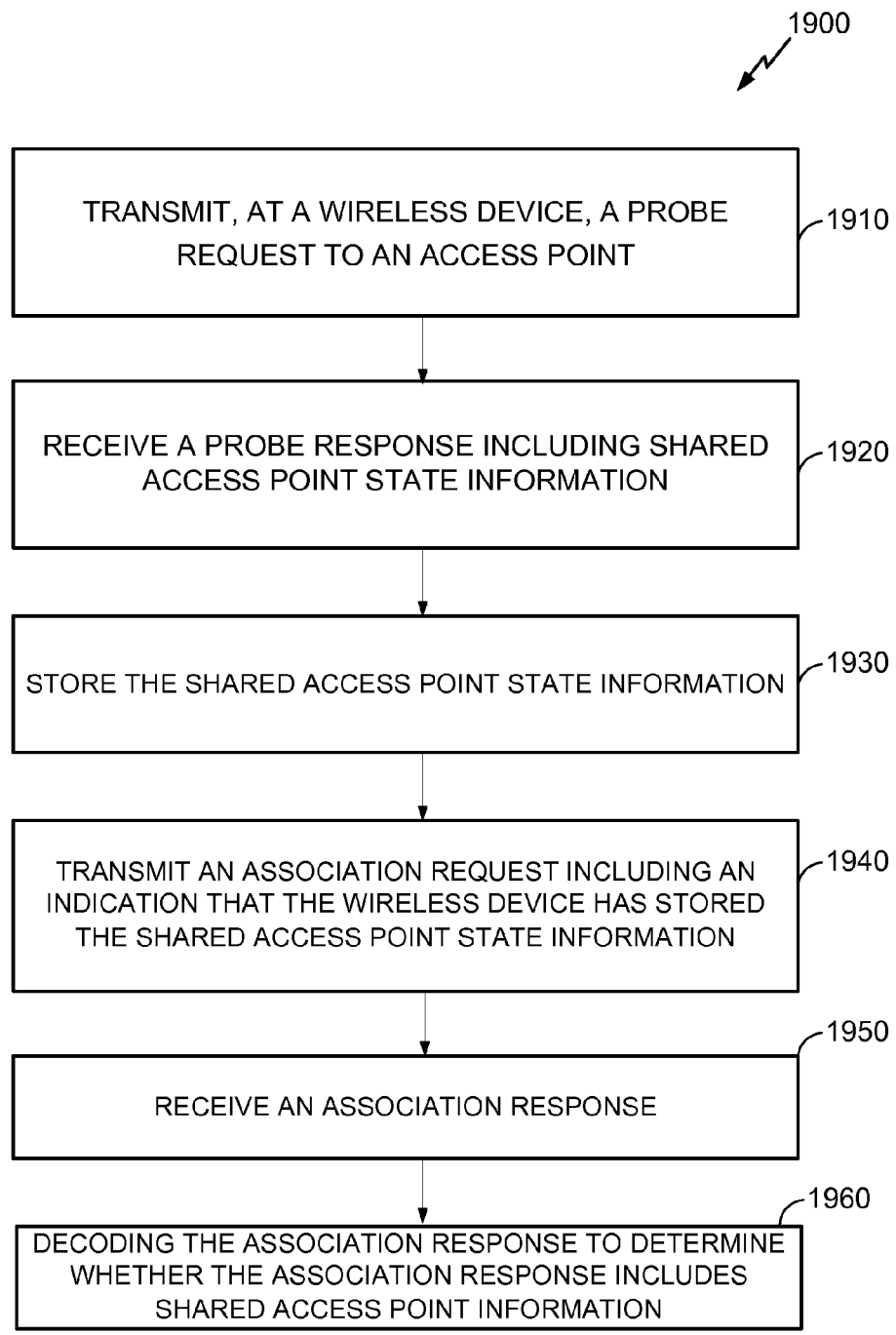
FIG. 17 shows a flowchart for an exemplary method of wireless communication that can be employed within the wireless communication system of FIG. 15.

FIG. 17 shows a flowchart 1900 for an exemplary method of wireless communication that can be employed within the wireless communication system 1700 of FIG. 15. The method can be implemented in whole or in part by the devices described herein, such as the wireless device 402 shown in FIG. 2. Although the illustrated method is described herein with reference to the wireless communication system 190 discussed above with respect to FIG. 1, the wireless communication systems 1700 discussed above with respect to FIG. 15, and the wireless device 402 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1910, the wireless device transmits a probe request. For example, the wireless device 106 can transmit the probe request 1710 to the access point 104.

Then, at block 1920, the wireless device receives a probe response including shared access point information. For example, the wireless device 106 can receive the probe response 1720 from the access point 104. The shared access point information can include information shared between one or more wireless communication frames, such as conventional probe responses and association responses. By omitting the shared access point state information from at least one frame, network traffic can be reduced.

Thereafter, at block 1930, the wireless device stores the shared access point information. For example, the wireless device 106 can store the shared access point information in the memory 406.

Next, at block 1940, the wireless device transmits an association request indicating that the shared access point information is stored. For example, the wireless device 106 can transmit the association request 1730. In some aspects, the wireless device transmits a version of the shared access point information that is stored. This may assist the access point in determining whether it should send shared access point information back to the wireless device in the association response.

Subsequently, at block 1950, the wireless device receives an association response omitting the shared access point information. For example, the wireless device 106 can receive the association response 1740 from the access point 104. As discussed above, in other embodiments, the wireless device 106 can transmit the association request without an indication that the shared access point information has been stored, for example in embodiments where the wireless device 106 has not yet received the shared access point information, the shared access point information is stale, etc. Thus, the wireless device can receive an association response including at least some shared access point information.

In block 1960, the association response is decoded to determine whether the association response includes shared access point information. If it does, the device performing process 1900 may store the shared access point information contained in the association response.

In an embodiment, the method shown in FIG. 17 can be implemented in a wireless device that can include a transmitting circuit, a storing circuit, and a receiving circuit. Those skilled in the art will appreciate that a wireless device can have more components than the simplified wireless device described herein. The wireless device described herein includes only those components useful for describing some prominent features of implementations within the scope of the claims.

The transmitting circuit can be configured to transmit the probe request and/or association request. In some embodiments, the transmitting circuit can be configured to perform at least blocks 1910 and/or 1930 of FIG. 17. The transmitting circuit can include one or more of the processor 404 (FIG. 2), transmitter 410 (FIG. 2), the antenna 416 (FIG. 2), and the transceiver 414 (FIG. 2). In some implementations, means for transmitting can include the transmitting circuit.

The storing circuit can be configured to store the shared wireless device state information. In some embodiments, the storing circuit can be configured to perform at least block 1920 of FIG. 17. The storing circuit can include one or more of the processor 404 (FIG. 2), the DSP 420, and the memory 406 (FIG. 2). In some implementations, means for storing can include the storing circuit.

The receiving circuit can be configured to receive the probe response. In some embodiments, the receiving circuit can be configured to perform at least block 1940 of FIG. 17. The receiving circuit can include one or more of the processor 404 (FIG. 2), receiver 412 (FIG. 2), the antenna 416 (FIG. 2), and the transceiver 414 (FIG. 2). In some implementations, means for receiving can include the receiving circuit.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. In a communication system including at least an access point and a plurality of wireless devices transmitting respective probe requests to the access point for determining whether the access point is within a range for initiating and maintaining a wireless communication link between each of the plurality of wireless devices and the access point, and the access point transmitting a probe response frame including communication parameters, a method of sharing access point state information, comprising:
    receiving, at the access point, a probe request from a wireless device;
    transmitting, at the access point, a probe response comprising shared access point state information;
    receiving, at the access point, an association request comprising an indication that the wireless device has stored the shared access point state information; and
    transmitting, at the access point, an association response conditionally including the shared access point state information based on the indication in the association request.

2. The method of claim 1, further comprising generating the shared access point state information for the probe response to comprise indications of one or more of shared rates, extended supported rates, supported operating classes, high-throughput (HT) capabilities, 20/40 basic service set (BSS) coexistence, and extended capabilities.

3. The method of claim 1, further comprising generating the probe response and the association response to each comprise a common identifier.

4. The method of claim 3, further comprising generating the common identifier to comprise one or more of: an explicit identifier in an information element; an implicit identifier comprising a media access control (MAC) address of the access point, an implicit identifier comprising a MAC sequence number of the probe response, an implicit identifier comprising a timestamp of the probe response, an implicit identifier comprising a checksum of the probe response, and an implicit identifier comprising the last 4 bytes of the probe response.

5. The method of claim 1, further comprising:
 decoding the association request to determine a version of shared access point information stored by the wireless device;
 determining whether a version of shared access point information available to the access point is newer than the version of shared access point information stored by the wireless device; and
 transmitting the association response based on the determining.

6. The method of claim 1, further comprising generating the association response to include shared access point information when the association request indicates the wireless device has not stored shared access point information, and generating the association response to omit the shared access point information otherwise.

7. The method of claim 1, further comprising generating the association response to include shared access point information when the version of shared access point information available to the access point is greater than the version of shared access point information stored by the device, and generating the association response to omit the shared access point information otherwise.

8. In a communication system including at least an access point and a plurality of wireless devices transmitting respective probe requests to the access point for determining whether the access point is within a range for initiating and maintaining a wireless communication link between each of the plurality of wireless devices and the access point, and the access point transmitting a probe response frame including communication parameters, an apparatus for sharing access point state information, comprising:
 a receiver configured to receive a probe request from a wireless device;
 a transmitter configured to transmit a probe response comprising shared access point state information, wherein the receiver is further configured to receive an association request comprising an indication that the wireless device has stored the shared access point state information, and
 the transmitter is further configured to transmit an association response conditionally including the shared access point state information based on the indication in the association request.

9. The apparatus of claim 8, further comprising a processor configured to generate the shared access point state information for the probe response to comprise indications of one or more of: shared rates, extended supported rates, supported operating classes, high-throughput (HT) capabilities, 20/40 basic service set (BSS) coexistence, and extended capabilities.

10. The apparatus of claim 8, further comprising a processor configured to generate the probe response and the association response to each comprise a common identifier.

11. The apparatus of claim 10, wherein the processor is further configured to generate the common identifier to comprise one or more of: an explicit identifier in an information element; an implicit identifier comprising a media access control (MAC) address of the access point, an implicit identifier comprising a MAC sequence number of the probe response, an implicit identifier comprising a timestamp of the probe response, an implicit identifier comprising a checksum of the probe response, and an implicit identifier comprising the last 4 bytes of the probe response.

12. The apparatus of claim 8, further comprising a processor configured to:
 decode the association request to determine a version of shared access point information stored by the device,
 determine whether a version of shared access point information available to the access point is newer than the version of shared access point information stored by the device, and
 wherein the transmitter is further configured to transmit the association response based on the determining.

13. The apparatus of claim 8, further comprising a processor configured to generate the association response to include shared access point information when the association request indicates the wireless device has not stored shared access point information, and generate the association response to omit the shared access point information otherwise.

14. The apparatus of claim 8, further comprising a processor configured to generate the association response to include shared access point information when the version of shared access point information available to the access point is greater than the version of shared access point information stored by the device, and generate the association response to omit the shared access point information otherwise.

15. In a communication system including at least an access point and a plurality of wireless devices transmitting respective probe requests to the access point for determining whether the access point is within a range for initiating and maintaining a wireless communication link between each of the plurality of wireless devices and the access point, and the access point transmitting a probe response frame including communication parameters, a method of sharing access point state information, comprising:
 transmitting, at a wireless device, a probe request to an access point;
 receiving, at the wireless device, a probe response comprising shared access point state information;
 storing the shared access point state information;
 transmitting an association request comprising an indication that the wireless device has stored the shared access point state information;
 receiving, at the wireless device, an association response; and
 decoding, at the wireless device, the association response to determine whether the association response includes shared access point state information.

16. The method of claim 15 wherein the shared access point state information comprises indications of one or more of shared rates, extended supported rates, supported operating classes, high-throughput (HT) capabilities, 20/40 basic service set (BSS) coexistence, and extended capabilities.

17. The method of claim 15, wherein the probe response and the association response each comprise a common identifier.

18. The method of claim 17, wherein the common identifier comprises one or more of: an explicit identifier in an information element; an implicit identifier comprising a media access control (MAC) address of the access point, an implicit identifier comprising a MAC sequence number of the probe response, an implicit identifier comprising a timestamp of the probe response, an implicit identifier comprising a checksum of the probe response, and an implicit identifier comprising the last 4 bytes of the probe response.

19. The method of claim 17, further comprising associating the shared access point state information with the association response based on the common identifier.

20. The method of claim 15, further comprising storing the shared access point information from the association response if the association response includes shared access point information.

21. The method of claim 15, further comprising generating the association request to indicate a version of the stored access point information.

22. In a communication system including at least an access point and a plurality of wireless devices transmitting respective probe requests to the access point for determining whether the access point is within a range for initiating and maintaining a wireless communication link between each of the plurality of wireless devices and the access point, and the access point transmitting a probe response frame including communication parameters, an apparatus for sharing access point state information, comprising:
   a transmitter configured to transmit a probe request to an access point;
   a receiver configured to receive a probe response comprising shared access point state information; and
   a processor configured to store the shared access point state information,
   wherein the transmitter is further configured to transmit an association request comprising an indication that the wireless device has stored the shared access point state information, and
   the receiver is further configured to receive an association response, and the processor is further configured to decode the association response to determine whether the association response includes shared access point state information.

23. The apparatus of claim 22 wherein the shared access point state information comprises indications of one or more of: shared rates, extended supported rates, supported operating classes, high-throughput (HT) capabilities, 20/40 basic service set (BSS) coexistence, and extended capabilities.

24. The apparatus of claim 22, wherein the probe response and the association response each comprise a common identifier.

25. The apparatus of claim 24, wherein the common identifier comprises one or more of: an explicit identifier in an information element; an implicit identifier comprising a media access control (MAC) address of the access point, an implicit identifier comprising a MAC sequence number of the probe response, an implicit identifier comprising a timestamp of the probe response, an implicit identifier comprising a checksum of the probe response, and an implicit identifier comprising the last 4 bytes of the probe response.

26. The apparatus of claim 24, wherein the processor is further configured to associate the shared access point state information with the association response based on the common identifier.

27. The apparatus of claim 22, wherein the processor is further configured to store the shared access point information from the association response if the association response includes shared access point information.

28. The apparatus of claim 22, wherein the processor is further configured to generate the association request to indicate a version of the stored access point information.

* * * * *